(12) United States Patent
Sanni et al.

(10) Patent No.: US 10,544,886 B2
(45) Date of Patent: Jan. 28, 2020

(54) FIBER-REINFORCED COMPOSITE PIPE AND COLD/WARM WATER PIPING SYSTEM

(71) Applicant: SEKISUI CHEMICAL CO., LTD., Osaka-Shi, Osaka (JP)

(72) Inventors: Toshifumi Sanni, Kyoto (JP); Nobuharu Terachi, Kyoto (JP); Yusuke Hoshino, Kyoto (JP); Shintaro Umeyama, Kyoto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 135 days.

(21) Appl. No.: 15/552,252

(22) PCT Filed: Feb. 18, 2016

(86) PCT No.: PCT/JP2016/054738
§ 371 (c)(1),
(2) Date: Aug. 18, 2017

(87) PCT Pub. No.: WO2016/133167
PCT Pub. Date: Aug. 25, 2016

(65) Prior Publication Data
US 2018/0038522 A1    Feb. 8, 2018

(30) Foreign Application Priority Data

Feb. 20, 2015 (JP) .................................. 2015-032018
May 19, 2015 (JP) .................................. 2015-101655
May 19, 2015 (JP) .................................. 2015-101914

(51) Int. Cl.
*F16L 11/08*  (2006.01)
*B32B 15/08*  (2006.01)
(Continued)

(52) U.S. Cl.
CPC .............. *F16L 11/083* (2013.01); *B32B 1/08* (2013.01); *B32B 15/08* (2013.01); *B32B 15/085* (2013.01);
(Continued)

(58) Field of Classification Search
CPC ...... F16L 11/083; F16L 9/12; F16L 2011/047; B32B 1/08; B32B 27/32
See application file for complete search history.

(56) References Cited

FOREIGN PATENT DOCUMENTS

| EP | 2602103 A1 | 6/2013 |
|----|-----------|--------|
| JP | S6132743 A | 2/1986 |

(Continued)

OTHER PUBLICATIONS

IP Australia, Examination Report No. 1 dated Oct. 9, 2018 in AU Patent Application No. 2016220736, 6 pages.

(Continued)

*Primary Examiner* — Michael C Miggins
(74) *Attorney, Agent, or Firm* — Masuvalley & Partners

(57) ABSTRACT

The present invention provides a fiber-reinforced composite pipe serving as a multi-layered pipe material having high strength and high dimensional stability and excellent in workability and provides a cold/warm water piping system excellent in dimensional stability and improved in workability. The fiber-reinforced composite pipe of the invention comprises a first layer of tubular form containing a polyolefin-based resin, a second layer of tubular form containing a polyolefin-based resin, a glass fiber and a compatibilizing agent, and a third layer of tubular form containing a polyolefin-based resin, in which the second layer is disposed on the outer side of the first layer and the third layer is disposed on the outer side of the second layer; the ratio of the thickness of the second layer relative to the total thickness of the first, second and third layers is 0.3 or more and 0.8 or
(Continued)

less; and the content of the polyolefin-based resin is 45 wt % or more and 84 wt % or less, the content of the glass fiber is 15 wt % or more and 45 wt % or less and the content of the compatibilizing agent is 0.5 wt % or more and 10 wt % or less in 100 wt % of the second layer.

8 Claims, 3 Drawing Sheets

(51) Int. Cl.
| | |
|---|---|
| B32B 27/30 | (2006.01) |
| B32B 27/18 | (2006.01) |
| B32B 27/20 | (2006.01) |
| B32B 15/085 | (2006.01) |
| B32B 27/08 | (2006.01) |
| B32B 1/08 | (2006.01) |
| B32B 27/32 | (2006.01) |
| F16L 9/12 | (2006.01) |
| F16L 11/04 | (2006.01) |

(52) U.S. Cl.
CPC ............. *B32B 27/08* (2013.01); *B32B 27/18* (2013.01); *B32B 27/20* (2013.01); *B32B 27/306* (2013.01); *B32B 27/32* (2013.01); *B32B 2262/101* (2013.01); *B32B 2307/304* (2013.01); *B32B 2597/00* (2013.01); *F16L 9/12* (2013.01); *F16L 2011/047* (2013.01)

(56) References Cited

FOREIGN PATENT DOCUMENTS

| | | |
|---|---|---|
| JP | H07253187 A | 10/1995 |
| JP | H10272738 A | 10/1998 |
| JP | 2001355767 A | 12/2001 |
| JP | 2006327154 A | 7/2006 |
| JP | 2007216555 A | 8/2007 |
| JP | 2010243129 A | 10/2010 |
| WO | WO2002/028971 A1 | 4/2002 |
| WO | WO2011/016747 A1 | 2/2011 |

OTHER PUBLICATIONS

WIPO, Japan Patent Office International Search Authority, International Search Report and Written Opinion dated May 10, 2016 in International Patent Application No. PCT/JP2016/054738, 9 pages.

10,544,886 B2

FIBER-REINFORCED COMPOSITE PIPE AND COLD/WARM WATER PIPING SYSTEM

RELATED APPLICATIONS

This application is the U.S. National Phase of and claims priority to International Patent Application No. PCT/JP2016/054738, International Filing Date Feb. 18, 2016, entitled Fiber-Reinforced Composite Pipe And Cold/Warm Water Piping System; which claims benefit of Japanese Application No. JP2015-032018 filed Feb. 20, 2015; Japanese Application No. JP2015-101914 filed May 19, 2015; and Japanese Application No. JP2015-101655 filed May 19, 2015; all of which are incorporated herein by reference in their entireties.

TECHNICAL FIELD

The present invention relates to a fiber-reinforced composite pipe and a cold/warm water piping system.

BACKGROUND ART

Polyolefin-based resins are relatively inexpensive and excellent in e.g., moldability, heat resistance, solvent resistance, mechanical properties and appearance. Because of this, polyolefin-based resins are processed into various types of compacts and used in a wide variety of fields. For example, a composition containing such a polyolefin-based resin is formed into a mold by extrusion molding and used as e.g., a deck material. The polyolefin-based resins are also excellent in quake resistance. Because of this, polyolefin-based resins have been recently increasingly used as e.g., gas pipes and water pipes.

As an example of a compact using a polyolefin-based resin, a polyolefin-based resin pipe is disclosed in Japanese Patent Laid-Open No. 2006-327154 (Patent Literature 1).

To enhance strength, a glass fiber is sometimes used in compacts. As an example of a compact using a glass fiber, a fiber-reinforced synthetic resin pipe having a cylindrical shape is disclosed in Japanese Patent Laid-Open No. 2007-216555 (Patent Literature 2). This pipe has a plurality of fiber-reinforced resin layers and fiber-reinforced resin layers are laminated in the circumferential direction of the cylinder. The fiber-reinforced resin layer has a glass fiber-reinforced resin layer, which is formed of a glass fiber and a synthetic resin, and an organic nonwoven fabric layer, which is formed of an organic nonwoven fabric and a synthetic resin.

International Publication No. WO02/28971 (Patent Literature 3) discloses a compact using a polyphenylene-based composite resin composition containing a glass fiber or an inorganic filler. The polyphenylene-based composite resin composition contains a polyphenylene ether (20 to 98 wt %), at least one type of resin (1 to 40 wt %) selected from the group consisting of a polystyrene, a polyphenylene sulfide, a polyether imide, a polycarbonate and a polyethylene (including HDPE, LDPE, LLDPE, VLDPE) and a glass fiber or an inorganic filler (1 to 40 wt %).

In piping systems conventionally used, the entire system is constituted basically by connecting pipes of a similar type, as is described, for example in Japanese Patent Laid-Open No. 2010-243129 (Patent Literature 4). Connecting pipes of different types is sometimes unavoidable in the case where e.g., lineup of ready-made pipelines and cost are limited; however, connecting heterogenous pipes is very difficult and extremely disadvantageous. In contrast, connecting homogenous pipes is easy and mechanical properties become equivalent. Likewise, the homogenous pipe connection has great advantages and thus has been actively employed.

CITATION LIST

Patent Literature

Patent Literature 1: Japanese Patent Laid-Open No. 2006-327154
Patent Literature 2: Japanese Patent Laid-Open No. 2007-216555
Patent Literature 3: International Publication No. WO 02/28971
Patent Literature 4: Japanese Patent Laid-Open No. 2010-243129

SUMMARY OF INVENTION

Technical Problem

In the case of compacts known in the art as described in Patent Literature 1 to Patent Literature 3, it is sometimes difficult to enhance both strength and dimensional stability. It is also sometimes difficult to enhance both strength and dimensional stability by simply using the prior-art compacts described in Patent Literature 1 to Patent Literature 3 in the case of preparing a multi-layered pipe material.

An object of the present invention is to provide a fiber-reinforced composite pipe as a multi-layered pipe material having high strength and high dimensional stability and excellent in workability.

In the homogenous pipe connection as described in Patent Literature 4, the piping material must be selected by focusing on advantageous properties for use in a piping system. The piping usually has both advantageous and disadvantageous characteristics for use in a piping system. For example, piping having satisfactory characteristics in view of strength tends to be inferior in workability; whereas piping having satisfactory characteristics in view of corrosion resistance tends to be inferior in easy handleability. Accordingly, a piping system constituted by connecting homogenous pipes inevitably receives not only the advantageous characteristics but also disadvantageous characteristics for use in the piping system as they are. Particularly, in the case of a cold/warm water piping system having a temperature width beyond 20° C., since the temperature condition at which piping is to be adapted is severe, demand characteristics for the piping become severe. As a result, selection of piping is extremely difficult.

In the circumstances, another object of the present invention is to provide a cold/warm water piping system excellent in dimensional stability and improved in workability.

Solution to Problem

The present invention includes the following fiber-reinforced composite pipes.
(1)
The fiber-reinforced composite pipe of the present invention comprises a first layer of tubular form containing a polyolefin-based resin, a second layer of tubular form containing a polyolefin-based resin, a glass fiber and a compatibilizing agent, and a third layer of tubular form containing a polyolefin-based resin. In the fiber-reinforced composite pipe, the second layer is disposed on the outer side of the first layer and the third layer is disposed on the outer side of the second layer; the ratio of the thickness of the second layer relative to the total thickness of the first, second and third layers is 0.3 or more and 0.8 or less; the content of the polyolefin-based resin is 45 wt % or more and 84 wt % or less, the content of the glass fiber is 15 wt % or more and 45 wt % or less and the content of the compatibilizing agent is 0.5 wt % or more and 10 wt % or less in 100 wt % of the second layer.

Owing to this, the fiber-reinforced composite pipe according to the present invention has high strength and high dimensional stability and is excellent in workability. Note that, the entire wall thickness refers to the total thickness of the fiber-reinforced composite pipe.

(2)

The fiber-reinforced composite pipe according to the above (1) comprises a gas barrier layer, in which the gas barrier layer may be disposed on the outer side of the third layer.

Owing to this, barrier property against a gas in contact with the outer peripheral surface of the fiber-reinforced composite pipe is enhanced.

(3)

The fiber-reinforced composite pipe according to the above (2) comprises an adhesive layer, in which the adhesive layer is disposed on the outer side of the third layer and the gas barrier layer may be disposed on the outer side of the adhesive layer.

Owing to this, the barrier property against a gas in contact with the outer peripheral surface of the fiber-reinforced composite pipe is enhanced; at the same time, adhesion between the third layer and the gas barrier layer is enhanced.

The present invention further includes the following cold/warm water piping system.

(4)

(4-1)

The cold/warm water piping system of the present invention is a piping system for transporting cold/warm water having a temperature width of 20° C. or more. The cold/warm water piping system of the present invention comprises a fiber-reinforced composite pipe containing a polyolefin resin and a glass fiber, a metal-reinforced composite pipe containing a polyolefin resin and a metal, and a connecting member connecting the fiber-reinforced composite pipe and the metal-reinforced composite pipe. Furthermore, the linear thermal expansion coefficient of the fiber-reinforced composite pipe is $10 \times 10^{-5}/°$ C. or less. Moreover, the volume occupied by the fiber-reinforced composite pipe in the total volume of the fiber-reinforced composite pipe and the metal-reinforced composite pipe is 70% or more.

As described above, the cold/warm water piping system of the present invention is constituted such that a fiber-reinforced composite pipe of a low linear expansion having a linear thermal expansion coefficient of $6 \times 10^{-5}/°$ C. or less occupies a volume of 70% or more. Owing to this, the cold/warm water piping system of the present invention is excellent in dimensional stability against temperature change of cold/warm water to be transported. Furthermore, since the piping system has not only light weight and processability like "easy-to-cut", which are provided by the fiber-reinforced composite pipe but also bendability and processability like "easy-to-be disposed" in a narrow piping space and connectability, which are provided by the metal-reinforced composite pipe, the workability of the entire system is improved. Moreover, since pipelines except joints are all constituted of resin-based flexible pipes, the system is also excellent in quake resistance.

(4-2)

In the cold/warm water piping system according to the above (4-1), the fiber-reinforced composite pipe may comprise at least the first layer, second layer and third layer of tubular form in this order in the direction from the center toward the outer periphery of the shaft. In this case, the first layer and third layer contain a polyolefin-based resin as a main component; and the second layer contains a polyolefin-based resin and a glass fiber. Further, the ratio of the thickness of the second layer relative to the entire thickness of the fiber-reinforced composite pipe is 0.3 or more.

As described above, since the system is constituted such that the thickness of the fiber-reinforced resin layer relative to the entire thickness of the fiber-reinforced composite pipe is 0.3 or more, more preferably, the dimensional stability can be obtained.

(4-3)

In the cold/warm water piping system according to the above (4-1) or (4-2), an average glass-fiber diameter may be 5 μm or more and 20 μm or less.

Owing to this, strength, dimensional stability and elongation at high temperature can be more preferably obtained.

(4-4)

The cold/warm water piping system of the present invention is a piping system for transporting cold/warm water having a temperature width of 20° C. or more. The cold/warm water piping system of the present invention comprises any one of the fiber-reinforced composite pipes specified in the above (1) to (3), a metal-reinforced composite pipe containing a polyolefin resin and a metal, and a connecting member connecting the fiber-reinforced composite pipe and the metal-reinforced composite pipe. Furthermore, the linear thermal expansion coefficient of the fiber-reinforced composite pipe is $10 \times 10^{-5}/°$ C. or less. Moreover, the volume occupied by the fiber-reinforced composite pipe in the total volume of the fiber-reinforced composite pipe and the metal-reinforced composite pipe is 70% or more.

As described above, the cold/warm water piping system of the present invention is constituted such that a fiber-reinforced composite pipe having a low linear thermal expansion coefficient of $10 \times 10^{-5}/°$ C. or less occupies a volume of 70% or more. Owing to this, the cold/warm water piping system of the present invention is excellent in dimensional stability against temperature change of the cold/warm water to be transported. In addition, since the fiber-reinforced composite pipe is constituted of any one of the fiber-reinforced composite pipes specified in the above (1) to (3), the fiber-reinforced composite pipe has high strength and further higher dimensional stability and is excellent in workability. Furthermore, since the piping system has not only light weight and processability like "easy-to-cut", which are provided by the fiber-reinforced composite pipe but also bendability and processability like "easy-to-be disposed" in a narrow piping space and connectability, which are provided by the metal-reinforced composite pipe, the workability of the entire system is improved. Moreover, since pipelines except joints are all constituted of resin-based flexible pipes, the system is also excellent in quake resistance.

(5)

In the cold/warm water piping system according to the above (4), the inner diameter of the fiber-reinforced composite pipe may be 19 mm or more and the inner diameter of the metal-reinforced composite pipe may be 75 mm or less.

Also, in the cold/warm water piping system according to the above (4), the inner diameter of the fiber-reinforced composite pipe may be 50 mm or more and the inner diameter of the metal-reinforced composite pipe may be 50 mm or less.

Now, the inner diameter of 50 mm is used as a border line. A part of piping having a larger diameter than 50 mm can be constituted of a fiber-reinforced composite pipe; whereas, a part of piping having a smaller diameter than 50 mm can be constituted of a metal-reinforced composite pipe. Owing to this, bendability and processability like "easy-to-be disposed" in a narrow piping space and connectability due to the metal-reinforced composite pipe can be more preferably obtained.

(6)

In the cold/warm water piping system according to the above (4) or (5), the connecting member may comprise a junction area for electrofusion for use in connection to the fiber-reinforced composite pipe and a screw coupling area for use in connection to the metal-reinforced composite pipe.

Owing to this, connectability is provided on the side of the metal-reinforced composite pipe, with the result that the connectability in a narrow piping space is guaranteed; at the same time, highly reliable connection can be made to the side of the fiber-reinforced composite pipe.

Advantageous Effects of Invention

Owing to the present invention, a fiber-reinforced composite pipe having high strength and high dimensional stability and excellent in workability is provided as a multilayered pipe material.

Also, owing to the present invention, a cold/warm water piping system excellent in dimensional stability and improved in workability is further provided.

DESCRIPTION OF EMBODIMENTS

Figure 1:
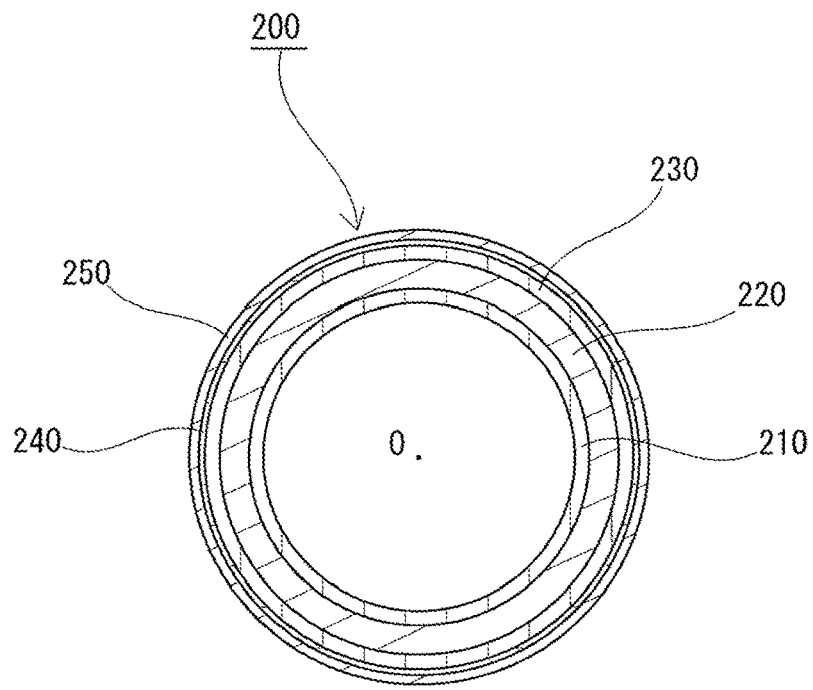
FIG. 1 is a schematic sectional view of a fiber-reinforced composite pipe according to an embodiment of the present invention.

Now, referring to the accompanying drawings, embodiments of the present invention will be described. In the following description, identical reference numerals are used to designate identical structural elements, and the names and functions of the elements are identical. Accordingly, any further explanation is omitted for brevity's sake.

[1. Fiber-Reinforced Composite Pipe]

[1-1. Layer Structure]

FIG. 1 is a schematic sectional view of a fiber-reinforced composite pipe according to an embodiment of the present invention. A fiber-reinforced composite pipe 200 (multilayer compact) shown in FIG. 1 comprises a first layer 210 of tubular form (inner layer/compact), a second layer 220 of tubular form (an intermediate layer/compact) disposed on the outer side of the first layer 210, and a third layer 230 of tubular form (outer layer/compact) disposed on the outer side of the second layer 220. The second layer 220 is laminated on the outer surface of the first layer 210 and the third layer 230 is laminated on the outer surface of the second layer 220. In this manner, the first layer 210, second layer 220 and third layer 230 are laminated in this order from the center toward the outer periphery of the shaft. The second layer 220 may be laminated in contact with the outer surface of the first layer 210 and the third layer 230 may be laminated in contact with the outer surface of the second layer 220.

The first layer 210 contains a polyolefin-based resin. The first layer 210 does not substantially contain a glass fiber unlike the second layer 220 described below. The second layer 220 contains a polyolefin-based resin and a glass fiber. In other words, the second layer 220 is formed of a compact of a polyolefin-based resin composition containing a polyolefin-based resin and a glass fiber. Since the second layer 220 is formed of a fiber-reinforced resin, low linear expansion performance is imparted to the fiber-reinforced composite pipe 200 and satisfactory dimensional stability thereof can be obtained. The second layer 220 may further contain a compatibilizing agent. The third layer 230 contains a polyolefin-based resin. The third layer 230 does not substantially contain a glass fiber, either, similarly to the first layer 210. Since the first layer 210, second layer 220 and third layer 230 contain a polyolefin-based resin, the entire fiber-reinforced composite pipe 200 has flexibility. When the pipe 200 is used, for example, in a cold/warm water piping system (described later), satisfactory quake resistance of the system can be obtained.

The fiber-reinforced composite pipe 200 may (or may not) further comprise an adhesive layer 240 of tubular form and a gas barrier layer 250 of a tubular form outside the first layer 210, second layer 220 and third layer 230. In the case of further comprising the adhesive layer 240 and the gas barrier layer 250, the adhesive layer 240 may be laminated on the outer surface of the third layer 230 and the gas barrier layer 250 may be laminated on the outer surface of the adhesive layer 240. The adhesive layer 240 may be laminated in contact with the outer surface of the third layer 230 and the gas barrier layer 250 may be laminated in contact with the outer surface of the adhesive layer 240.

Note that, the gas barrier layer 250 may be laminated on the inner surface of the first layer 210 with an adhesive layer interposed between them. In this case, in the fiber-reinforced composite pipe 200, the third layer 230 serves as the outermost layer, an adhesive layer, the gas barrier layer 250, an adhesive layer and the innermost layer are laminated on the inner surface of the first layer 210 in the order. The innermost layer is defined as a layer containing a polyolefin-based resin for protecting the gas barrier layer from cold/warm water.

The gas barrier layer 250 contains a gas barrier resin. The gas barrier layer 250 is provided in order to enhance a barrier property against a gas in contact with the outer peripheral surface of the fiber-reinforced composite pipe 200.

The adhesive layer 240 contains an adhesive resin. The adhesive layer 240 is provided in order to enhance adhesion between the third layer 230 and the gas barrier layer 250. The adhesive layer 240 is preferably tubular, more specifically, forms a tubular shape in contact with the entire outer peripheral surface of the third layer 230; however, the shape of the layer 240 is not limited to this mode. For example, the layer 240 may be partially disposed on the outer peripheral surface of the third layer 230 in the shaft direction and/or in the circumferential direction.

The first layer 210 is the innermost layer of the fiber-reinforced composite pipe 200 and in contact with an object (fluid) to be transported through the fiber-reinforced composite pipe 200. In the case where the pipe 200 is used a cold/warm water piping system (described later), the fluid to be in contact with the first layer 210 is cold/warm water. In the embodiment, the gas barrier layer 250 is the outermost layer of the fiber-reinforced composite pipe 200 and exposed to external environment. When the fiber-reinforced composite pipe 200 has neither the adhesive layer 240 nor the gas barrier layer 250, the third layer 230 is the outermost layer of the multilayer compact.

In the fiber-reinforced composite pipe 200 according to the embodiment, the first layer 210, second layer 220 and third layer 230 are laminated so as to be directly in contact with each other; however, the present invention is not limited to this mode. The first layer 210 and the second layer 220 and/or the second layer 220 and the third layer 230 may be indirectly laminated via, for example, an adhesive layer.

The fiber-reinforced composite pipe 200 is constituted of a resin and a glass fiber, as described above and containing no metal layer, unlike a metal-reinforced composite pipe 300. The fiber-reinforced composite pipe 200 is lightweight and easily cut and thus excellent in workability.

[1-2. Thickness]

In the fiber-reinforced composite pipe 200, the ratio (R2) of the thickness of the second layer 220 relative to the total thickness of the first layer 210, second layer 220 and third layer 230 may be, for example, 0.3 or more and 0.8 or less. The ratio (R2) may be preferably 0.4 or more, more preferably 0.45 or more, further preferably 0.5 or more and particularly preferably 0.55 or more; and preferably 0.75 or less. If the ratio (R2) is the lower limit or more, dimensional stability is further more improved. If the ratio (R2) is the upper limit or less, fusibility and workability are further more enhanced and impact resistance and quake resistance are further more enhanced.

In the fiber-reinforced composite pipe 200, the ratio (R1) of the thickness of the first layer 210 relative to the total thickness of the first layer 210, second layer 220 and third layer 230 is preferably 0.1 or more and more preferably 0.12 or more; and preferably 0.4 or less, more preferably 0.35 or less, further preferably 0.3 or less, particularly preferably 0.25 or less and most preferably 0.23 or less. If the ratio (R1) is the lower limit or more, fusibility and workability are more enhanced, impact resistance and quake resistance are further more enhanced. If the ratio (R1) is the upper limit or less, dimensional stability is further more improved.

In the fiber-reinforced composite pipe 200, the ratio (R3) of the thickness of the third layer 230 relative to the total thickness of the first layer 210, second layer 220 and third layer 230 is preferably 0.1 or more and more preferably 0.12 or more; and preferably 0.4 or less, more preferably 0.35 or less, further preferably 0.3 or less, particularly preferably 0.25 or less and most preferably 0.23 or less. If the ratio (R3) is the lower limit or more, fusibility and workability are further more enhanced, impact resistance and quake resistance are further more enhanced. If the fiber-reinforced composite pipe 200 has neither the adhesive layer 240 nor the gas barrier layer 250, since the third layer 230 is the outermost layer, electrofusion joining (described later) is further more reliably carried out. If the ratio (R3) is the upper limit or less, dimensional stability is further more improved.

The total thickness of the first layer 210, second layer 220 and third layer 230 is preferably 1.5 mm or more and more preferably 3.5 mm or more; and preferably 60 mm or less and more preferably 35 mm or less. If the thickness is the lower limit or more, rigidity, pressure resistance and impact resistance are further more enhanced. If the thickness is the upper limit or less, light weight, secondary processability and moldability are further more enhanced.

In the case where the fiber-reinforced composite pipe 200 contains other layers such as the adhesive layer 240 and the gas barrier layer 250 other than the first layer, second layer and third layer, as is in the embodiment, the other layers may be constituted such that the ratio of the total thickness of the other layers relative to the entire thickness of the fiber-reinforced composite pipe 200 is, for example, 0.002 or more and 0.2 or less, preferably 0.003 or more and 0.1 or less. If the total thickness of the other layers is the lower limit or more, the characteristics of the other layers can be effectively provided to the fiber-reinforced composite pipe 200. If the total thickness of the other layers is the upper limit or less, low linear expansion performance of the second layer 220 can be more effectively provided to the fiber-reinforced composite pipe 200. Note that, the total thickness of the adhesive layer 240 and the gas barrier layer 250 may be 0.125 mm or more and 0.4 mm or less.

The thickness of the adhesive layer 240 is preferably 50 $\mu$m or more and more preferably 75 $\mu$m or more; and preferably 200 $\mu$m or less and more preferably 150 $\mu$m or less. If the thickness of the adhesive layer 240 is the lower limit or more, the thickness is further more easily controlled and adhesiveness is further more enhanced. If the thickness of the adhesive layer 240 is the upper limit or less, the amount of material to be used reduces to reduce the material cost reduces and to achieve a lighter weight.

The thickness of the gas barrier layer 250 is preferably 75 $\mu$m or more and more preferably 100 $\mu$m or more; and preferably 200 $\mu$m or less and more preferably 150 $\mu$m or less. If the thickness of the gas barrier layer 250 is the lower limit or more, the thickness of the gas barrier layer 250 can be easily controlled and gas barrier property is further more enhanced. If the thickness of the gas barrier layer 250 is the upper limit or less, the amount of material to be used reduces and the material cost reduces, with the result that the weight of the layer reduces.

Note that, if the fiber-reinforced composite pipe 200 comprises the gas barrier layer 250, in order to carry out electrofusion joining (described later), the gas barrier layer 250 and the adhesive layer 240 are removed from the end portion of the fiber-reinforced composite pipe 200 to expose the third layer 230 and then electrofusion joining may be applied.

[1-3. Composition]

In the second layer 220 (100 wt %), the content of a polyolefin-based resin as mentioned above may be 45 wt % or more and 84 wt % or less and the content of a glass fiber as mentioned above may be 15 wt % or more and 45 wt % or less. Further if a compatibilizing agent as mentioned above is contained, the content of the compatibilizing agent may be 0.5 wt % or more and 10 wt % or less. In the second layer 220 (100 wt %), the content of the polyolefin-based resin is preferably 50 wt % or more and more preferably 57 wt % or more; and preferably 79 wt % or less and more preferably 73 wt % or less. Particularly, in the second layer 220 (100 wt %), if the content of the polyolefin-based resin is 79 wt % or less, dimensional stability is further more enhanced. In the second layer 220 (100 wt %), the content of the glass fiber is preferably 20 wt % or more and more preferably 25 wt % or more; and preferably 40 wt % or less and more preferably 35 wt % or less. Particularly, in the second layer 220 (100 wt %), if the content of the glass fiber is 40 wt % or less, creep performance is further more enhanced. In the second layer 220 (100 wt %), the content of the compatibilizing agent is preferably 1 wt % or more and more preferably 2 wt % or more; and preferably 8 wt % or less. Particularly, in the second layer 220 (100 wt %), if the content of the compatibilizing agent is 10 wt % or less, creep performance is further more improved. In the second layer 220 (100 wt %), if the content of the compatibilizing agent is 10 wt % or less, dimensional stability tends to be further more enhanced. In the second layer 220 (100 wt %), the content of the polyolefin-based resin may be 50 wt % or more and 79 wt % or less, the content of the glass fiber may be 20 wt % or more and 40 wt % or less, and the content of the compatibilizing agent may be 1 wt % or more and 10 wt % or less. The preferable lower limits and upper limits of contents of the polyolefin-based resin, glass fiber and compatibilizing agent in the polyolefin-based resin composition (100 wt %) for forming the above the second layer 220, are the same as the preferable lower limits and upper limits of the contents of the polyolefin-based resin, glass fiber and compatibilizing agent in the second layer 220.

In the second layer 220, if the content of a polyolefin-based resin is the lower limit or more, creep performance and quake resistance are further more improved. If the content of the polyolefin-based resin is the upper limit or less, dimensional stability is further more improved. If the content of a glass fiber is the lower limit or more, dimensional stability is further more improved. If the content of a glass fiber is the upper limit or less, creep performance is further more improved. If the content of the compatibilizing agent is the lower limit or more, the compatibility of individual components increases and pressure resistance is further more enhanced. If the content of the compatibilizing agent is the upper limit or less, creep performance is further more improved.

In the first layer 210, the content of a polyolefin-based resin is preferably 90 wt % or more and more preferably 95 wt % or more; and preferably 100 wt % (whole amount) or less. In the third layer 230, the content of a polyolefin-based resin is preferably 90 wt % or more and more preferably 95 wt % or more; and preferably 100 wt % (whole amount) or less.

[1-4. Components]
[1-4-1. Polyolefin-Based Resin]

The polyolefin-based resins to be used in the first layer 210, second layer 220 and third layer 230 are not particularly limited and polyolefin-based resins known in the art can be used. The polyolefin-based resins may be used alone or in combination of two or more. The polyolefin-based resins to be used in individual layers. i.e., the first layer 210, second layer 220 and third layer 230, may be the same or different. In consideration of adhesion between the layers, the same resin is preferably used in the layers adjacent to each other.

Examples of the polyolefin-based resin include a polyethylene, a polypropylene, a polybutene, an ethylene-vinyl acetate copolymer and an ethylene-α-olefin copolymer. In order to further more effectively enhance the strength, dimensional stability and elongation at high temperature of the fiber-reinforced composite pipe 200 and/or to further more effectively enhance flexibility leading to quake resistance, a polyethylene or a polypropylene is preferable and a polyethylene is more preferable.

Examples of the polyethylene (PE) include LDPE, LLDPE and HDPE. Examples of the polypropylene (PP) include homo PP, block PP and random PP. Examples of the polybutene include polybutene-1.

The ethylene-α-olefin copolymer is particularly preferably a copolymer obtained by copolymerizing an α-olefin such as propylene, 1-butene, 1-pentene, 1-hexene, 4-methyl-1-pentene or 1-octene with ethylene in a ratio of about several mol %.

In order to improve hot internal pressure creep performance, it is further preferable that a polyolefin-based resin adapts to PE100, which is obtained based on the long-term water pressure intensity in accordance with ISO/TR9080 and certifies that a pipe is not broken at a constant stress value of 10.0 MPa or more at 20° C. for 50 years.

[1-4-2. Glass Fiber]

The length of a glass fiber contained in the second layer 220 may be the length of the glass fiber by subjecting a glass fiber having a length (before molding) of preferably 0.05 mm or more, more preferably 0.1 mm or more, further preferably 0.3 mm or more, preferably 10 mm or less, more preferably 9 mm or less and further preferably 6 mm or less to a molding process. The length of the fiber before subjected to a molding process may be maintained as the length of a glass fiber contained in the second layer 220 as being a compact or less than the length (100%) of the fiber before the molding process. If the length is shorter than the length of the fiber before the molding process, the length may be reduced up to 0.06% or more and 10% or less thereof. If the length of the fiber is shorter than that before a molding process, the length of the glass fiber contained in the second layer 220 may be, for example, 0.002 mm or more and 0.3 mm or less. If the length of the glass fiber is the lower limit or more and the upper limit or less, the strength, dimensional stability and elongation at high temperature of a multi-layered pipe material is effectively increased. A polyolefin-based resin composition for forming the second layer 220 preferably contains a glass fiber having the above preferable fiber length. The second layer 220 is preferably obtained by molding a polyolefin-based resin composition containing a glass fiber having the above preferable fiber length.

The fiber length refers to an average length of a plurality of filaments of the glass fiber contained in the second layer 220; more specifically, may be an average length value of 100 glass fiber filaments randomly selected from the glass fiber contained in the second layer 220.

The diameter of the glass fiber contained in the second layer 220 is preferably 1 μm or more and more preferably 5 μm or more; and preferably 30 μm or less, more preferably 20 μm or less and further preferably 15 μm or less. If the diameter of the glass fiber is the lower limit or more and the upper limit or less, the strength, dimensional stability and elongation at high temperature of a multi-layered pipe material are effectively enhanced. A polyolefin-based resin composition for forming the second layer 220 preferably contains a glass fiber having a preferable fiber diameter as mentioned above. The second layer 220 is preferably obtained by molding a polyolefin-based resin composition containing a glass fiber having a preferable fiber diameter as mentioned above.

The fiber diameter refers to an average value of the largest diameters of individual filaments of the glass fiber contained in the second layer 220; more specifically may be an average value of the largest diameters of 100 glass fiber filaments randomly selected from the glass fiber contained in the second layer 220.

The glass fiber whose surface may be treated. Examples of the surface preparation agent include methacryl silane, acryl silane, aminosilane, imidazole silane, vinyl silane and epoxy silane. Preferably aminosilane is mentioned. The glass fiber is preferably treated with aminosilane because a further more excellent effect of the invention is obtained.

[1-4-3. Compatibilizing Agent]

Examples of the compatibilizing agent that may be used in the second layer 220 include a maleic acid-modified polyolefin, a silane-modified polyolefin and a chlorinated polyolefin. Note that, such a compatibilizing agent is distinguished from the polyolefin-based resin which is described in the section of "polyolefin-based resin" for the sake of constitution of the present invention. The compatibilizing agents may be used alone or in combination of two or more.

In order to further more effectively enhance the strength, dimensional stability and elongation at high temperature of the fiber-reinforced composite pipe 200, the compatibilizing agent is preferably a maleic acid-modified polyolefin or a silane-modified polyolefin.

[1-4-4. Adhesive Resin]

Examples of the adhesive resin constituting the adhesive layer 240 include a rubber-based hot melt adhesive and a modified polyolefin (particularly, a modified polyethylene and a modified polypropylene). Examples of the modified polyolefin include an acid-modified polyolefin and a silane-modified polyolefin. Examples of modification method for a polyolefin include modification by grafting and copolymerization. An acid-modified polyolefin is obtained by modifying a polyolefin-based resin with an unsaturated carboxylic acid. Examples of the unsaturated carboxylic acid include acrylic acid, methacrylic acid, maleic acid, nadic acid, fumaric acid, itaconic acid, crotonic acid, citraconic acid, sorbic acid, mesaconic acid, angelic acid and phthalic acid. Examples of a derivative thereof include an acid anhydride, an ester, an amide, an imide and a metal salt thereof. Specific examples thereof include maleic anhydride, itaconic anhydride, citraconic anhydride, nadic anhydride, phthalic anhydride, methyl acrylate, methyl methacrylate, ethyl acrylate, butyl acrylate, monoethyl ester of maleic acid, acrylamide, maleamic acid, maleimide, N-butyl maleimide, sodium acrylate and sodium methacrylate. Of them, an unsaturated dicarboxylic acid and a derivative thereof are preferable. In particular, maleic anhydride and phthalic anhydride are preferably mentioned. The modified polyolefins may be used alone or in combination of two or more.

[1-4-5. Gas Barrier Resin]

Examples of the gas barrier resin constituting the gas barrier layer 250 include resins such as a polyvinyl alcohol (PVA), an ethylene vinyl alcohol copolymer (EVOH), a polyvinylidene chloride resin (PVDC) and a polyacrylonitrile (PAN).

[1-4-6. Other Components]

The first layer 210, second layer 220, third layer 230, adhesive layer 240 and gas barrier layer 250 each may contain a thermoplastic resin except a polyolefin-based resin. However, if a thermoplastic resin except a polyolefin-based resin is contained, the content of the thermoplastic resin except a polyolefin-based resin in a polyolefin-based resin composition is preferably lower than the content of a polyolefin-based resin in the polyolefin-based resin composition (i.e., less than 50% of the entire resin component).

To further more enhance the durability of the fiber-reinforced composite pipe 200 under high temperature and to suppress a reduction of durability by a metal such as copper, the first layer 210, second layer 220 and third layer 230 each preferably contain an antioxidant. The antioxidants may be used alone or in combination of two or more.

Examples of the antioxidants include a hindered phenolic antioxidant, a phosphorus antioxidant, a sulfur-based antioxidant, an amine-based antioxidant and a lactone-based antioxidant.

Examples of the hindered phenolic antioxidant include pentaerythritoltetrakis[3-(3,5-di-tert-butyl-4-hydroxyphenyl)propionate], thiodiethylenebis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3-(3,5-di-tert-butyl-4-hydroxyphenyl)propionamide], benzenepropanoic acid, 3,5-bis(1,1-dimethylethyl)-4-hydroxy, a C7-C9 side-chain alkyl ester, 3,3',3",5,5',5"-hexa-tert-butyl-a,a',a"-(mesitylene-2,4,6-triyl)tri-p-cresol, 4,6-bis(dodecylthiomethyl)-o-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H, 5H)-trione, 1,3,5-tris[(4-tert-butyl-3-hydroxy-2,6-xylyl)methyl]-1,3,5-triazine-2,4,6(1H,3H,5H)-trione, 2,6-di-tert-butyl-4-[4,6-bis(octylthio)-1,3,5-triazin-2-ylamino]phenol and diethyl [{3,5-bis(1,1-dimethylethyl)-4-hydroxyphenyl}methyl]phosphonate.

Examples of the phosphorus antioxidant include tris(2,4-di-tert-butylphenyl)phosphite, tris[2-[[2,4,8,10-tetra-tert-butyldibenzo[d,f][1,3,2]dioxaphosphin-6-yl]oxy]ethyl] amine, bis(2,4-di-tert-butylphenyl) pentaerythritoldiphosphite, bis[2,4-bis(1,1-dimethylethyl)-6-methylphenyl]ethyl phosphite and tetrakis(2,4-di-tert-butylphenyl) (1,1-biphenyl)-4,4'-diylbisphosphonite.

Examples of the lactone-based antioxidant include a reaction product between 3-hydroxy-5,7-di-tert-butyl-furan-2-one and o-xylene.

To further more enhance the durability of the fiber-reinforced composite pipe 200 under high temperature and suppress a reduction of the durability by a metal such as copper, the antioxidant, which is contained in the first layer 210, second layer 220 and third layer 230, is preferably a phenolic antioxidant and more preferably a hindered phenolic antioxidant. The phenolic antioxidants and hindered phenolic antioxidants may be used alone or in combination of two or more.

To further more enhance the durability of the fiber-reinforced composite pipe 200 under high temperature and suppress a reduction of the durability by a metal such as copper, the antioxidant is preferably stearyl 3-(3,5-di-tert-butyl-4-hydroxyphenyl)propionate or 2,4,6-tris(3',5'-di-tert-butyl-4'-hydroxybenzyl)mesitylene. The polyolefin-based resin composition preferably contains stearyl 3-(3,5-di-tert-butyl-4-hydroxyphenyl)propionate or 2,4,6-tris(3',5'-di-tert-butyl-4'-hydroxybenzyl)mesitylene.

The contents of the antioxidant, phenolic antioxidant and hindered phenolic antioxidant in the first layer 210, second layer 220 and third layer 230 (100 wt %) each are preferably 0.01 wt % or more and more preferably 0.1 wt % or more; and preferably 5 wt % or less, more preferably 1 wt % or less and further preferably 0.5 wt % or less. If the contents of the antioxidant, phenolic antioxidant and hindered phenolic antioxidant are the lower limit or more, the durability of the fiber-reinforced composite pipe 200 under high temperature is further more enhanced. If the contents exceed the upper limit, the durability of the fiber-reinforced composite pipe 200 under high temperature does not change. Because of this, if the contents are the upper limit or less, excessive use of the antioxidant(s) can be suppressed.

The first layer 210, second layer 220 and third layer 230, if necessary, may contain additives such as a crosslinking agent, a copper-damage inhibitor, a lubricant, a light stabilizer and a pigment.

As the crosslinking agent, e.g., an organic peroxide is mentioned. Examples of the organic peroxide to be contained in a polyolefin-based resin composition include dicumyl peroxide, diisopropylbenzene hydroperoxide and 2,5-dimethyl-2,5-di(t-butylperoxy)hexine. The crosslinking agents may be used alone or in combination of two or more.

The amount of organic peroxide to be used is not particularly limited. When an organic peroxide is used, the content of the organic oxide relative to a polyolefin-based resin (100 parts by weight) is preferably 0.01 part by weight or more; and preferably 2 parts by weight or less and more preferably 1 part by weight or less.

Examples of the lubricant include, but are not particularly limited to, a fluorine-based lubricant, a paraffin wax-based lubricant and a stearic acid-based lubricant. The lubricants may be used alone or in combination of two or more.

The amount of lubricant to be used is not particularly limited. The content of a lubricant relative to a polyolefin-based resin (100 parts by weight) is preferably 0.01 part by weight or more and preferably 3 parts by weight or less.

Examples of the light stabilizer include, but are not particularly limited to, UV absorbers such as salicylic acid ester-based, benzophenone-based, benzotriazole-based and cyanoacrylate-based UV absorbers; and a hindered amine-based light stabilizer. The light stabilizers may be used alone or in combination of two or more.

Examples of the pigment include, but are not particularly limited to, organic pigments such as azo-based, phthalocyanine-based, threne-based and dye lake-based pigments and inorganic pigments such as oxide-based, molybdenum chromate-based, sulfide-selenide-based and ferrocyanide-based pigments. The pigments may be used alone or in combination of two or more.

[1-5. Linear Thermal Expansion Coefficient]

The linear thermal expansion coefficient of the fiber-reinforced composite pipe 200 is $11 \times 10^{-5}/°$ C. or less, more preferably $10 \times 10^{-5}/°$ C. or less, still more preferably $6 \times 10^{-5}/°$ C. or less, further preferably $5.5 \times 10^{-5}/°$ C. or less, further more preferably $5 \times 10^{-5}/°$ C. or less, particularly preferably $4.5 \times 10^{-5}/°$ C. or less and most preferably $4 \times 10^{-5}/°$ C. or less. The linear thermal expansion coefficient of the fiber-reinforced composite pipe 200 is preferably low. If the linear thermal expansion coefficient of the fiber-reinforced composite pipe 200 is low, thermal expansion/contraction rarely occurs. Thus, generation of thermal stress is suppressed at the site where a support member is required and the number of applicable sites of the fiber-reinforced composite pipe 200 increases. If the linear thermal expansion coefficient of the fiber-reinforced composite pipe 200 is low, when the fiber-reinforced composite pipe 200 is applied to a cold/warm water piping system (described later), thermal expansion/contraction of the pipe rarely occurs in response to cold/warm water having a temperature width of 20° C. or more flowing through.

The linear thermal expansion coefficient is determined as follows. The fiber-reinforced composite pipe 200 is cut into pieces having a length along the shaft direction of 1 m to obtain evaluation samples. The evaluation samples obtained are stored at 60° C. (Thot) for 2 hours. Immediately after the storage period at 60° C., length along the shaft direction (Lhot) is measured. Then, the same evaluation sample is stored at 5° C. (Tcool) for 2 hours. Immediately after the storage period at 5° C., length along the shaft direction (Lcool) is measured. The obtained values are assigned in the following Expression 1 to computationally obtain the linear thermal expansion coefficient.

[Expression 1]

$$\text{Linear thermal expansion} = \frac{Lhot - Lcool}{Lcool\,(Thot - Tcool)} \quad \text{(Expression 1)}$$

[1-6. Hot Internal Pressure Creep Performance]

The hot internal pressure creep performance of the fiber-reinforced composite pipe 200 at 80° C. is 1000 hours or more at a circumferential stress of 5.0 MPa, more preferably 1000 hours or more at 5.1 MPa, further preferably 1000 hours or more at 5.2 MPa and particularly preferably 1000 hours or more at 5.5 MPa. The time for the hot internal pressure creep performance is failure time. The creep performance of the fiber-reinforced composite pipe 200 at high temperature is preferably high. If the creep performance of the fiber-reinforced composite pipe 200 at high temperature is high, application range of a pipe for transporting a high temperature fluid is widened. If a pipe has both the linear expansion performance and creep performance, the pipe is more useful as a cold/warm-water pipe. As the fracture morphology, relatively brittle fracture is preferable and ductile fracture is more preferable.

The hot internal pressure creep performance at 80° C. is tested at 80° C. by a hot internal pressure creep test machine. As the hot internal pressure creep test machine, a test machine manufactured by Kondo Kagaku Co., Ltd. is mentioned. The method used is such that the fiber-reinforced composite pipe 200 is cut into pieces having a length of 50 cm and placed in a constant-temperature water tank controlled at 80° C.; and using a specific airtight stopper (jig), water pressure was applied to set a desired circumferential stress.

[1-7. Molding]

The fiber-reinforced composite pipe 200 can be obtained by preparing individual resin compositions for the first layer 210, second layer 220, third layer 230, adhesive layer 240 and the gas barrier layer 250 and coextruding them for molding. Examples of a molding machine include, but are not particularly limited to, a single screw extruder, a twin-screw (different direction) parallel extruder, a twin-screw (different direction) conical extruder and a twin-screw (same direction) extruder. The molds for shaping and resin temperature or others are not particularly limited.

[2. Cold/Warm Water Piping System]

[2-1. Constitution of Cold/Warm Water Piping System]

Figure 2:
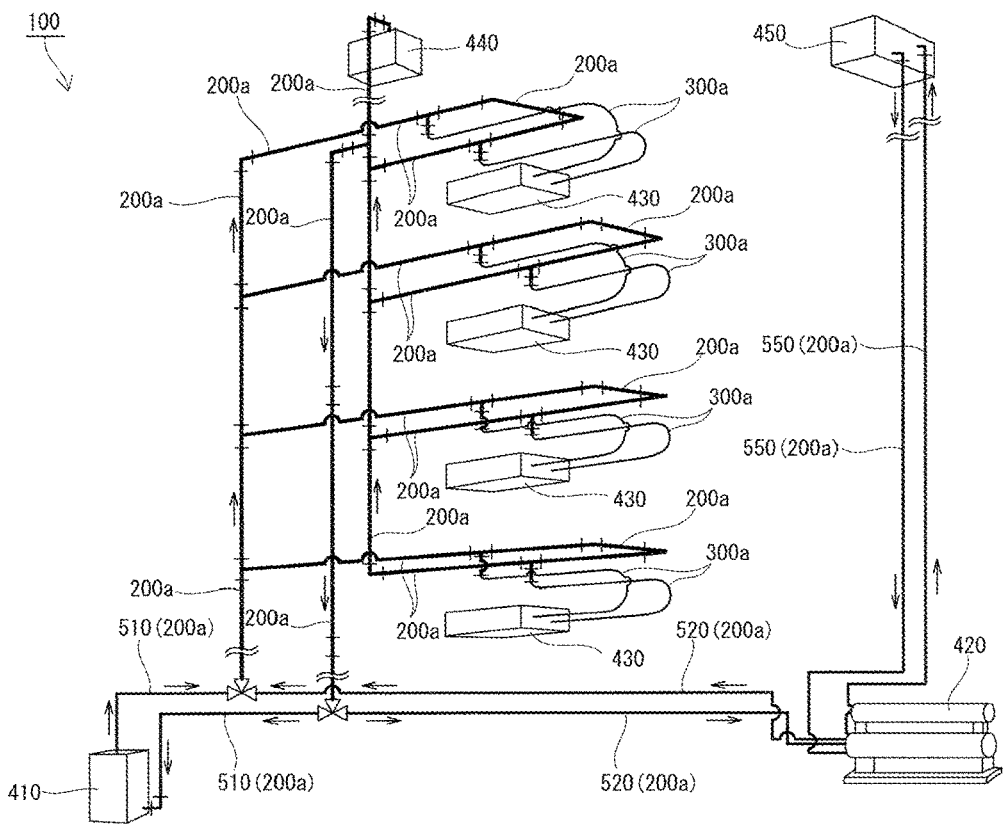
FIG. 2 is a schematic view of one example of the cold/warm water piping system of the present invention.

FIG. 2 schematically shows a cold/warm water piping system of the present invention. The cold/warm water piping system 100 shown in FIG. 2 is used for cold/warm water piping of air conditioner. The cold/warm water piping system 100 comprises a fiber-reinforced composite pipe 200*a* and a metal-reinforced composite pipe 300*a*.

The fiber-reinforced composite pipe 200*a* occupies a volume of 70% or more relative to the total volume of the fiber-reinforced composite pipe 200*a* and the metal-reinforced composite pipe 300*a*. Since the fiber-reinforced composite pipe 200*a* is excellent in dimensional stability, the cold/warm water piping system 100, which is constituted such that the volume of the fiber-reinforced composite pipe 200*a* occupies a major part of the total volume, is excellent in dimensional stability to a temperature change of cold/warm water to be transported.

The fiber-reinforced composite pipe 200a, since it is light weight and easily cut, is excellent in workability. In addition to this, the metal-reinforced composite pipe 300a, since it is excellent in bendability and easily disposed and connected even in a narrow space, is excellent in workability. In the cold/warm water piping system 100, these excellent properties (workability) synergetically act to remarkably improve entire workability. In addition, the fiber-reinforced composite pipe 200a and the metal-reinforced composite pipe 300a both are resin-based flexible pipes. Because of this, the entire cold/warm water piping system 100 is excellent in quake resistance.

The temperature width of cold/warm water to be transported in the cold/warm water piping system 100 is 20° C. or more. The upper limit of the range of the temperature width varies depending upon e.g., the heatproof temperature of the resins constituting the fiber-reinforced composite pipe 200a and the metal-reinforced composite pipe 300a and thus is not particularly limited. The upper limit of the temperature, may be, for example 105° C., preferably 95° C., further preferably 75° C. and further more preferably 55° C. The specific temperature of cold/warm water also varies depending upon e.g., heatproof temperatures of resins constituting the fiber-reinforced composite pipe 200a and the metal-reinforced composite pipe 300a and thus is not particularly limited. If a polyethylene-based resin is used, the temperature of cold/warm water may be −5° C. or more and 60° C. or less. If a polypropylene-based resin is used, the temperature of cold/warm water may be −5° C. or more and 90° C. or less or −5° C. or more and 100° C. or less.

The cold/warm water piping system 100 contains a hot-water boiler 410, a refrigerator (in the embodiment, absorption type refrigerator) 420, a fan coil unit 430 and an expansion tank 440, and the entire pipeline for transporting cold/warm water going in and out of the fan coil unit 430 is constituted of the fiber-reinforced composite pipe 200a and the metal-reinforced composite pipe 300a. In FIG. 2, a pipe line with an arrow, which points the direction of cold/warm water flowing into the fan coil unit 430, indicates an outward path; whereas a pipe line with an arrow, which points the direction of cold/warm water flowing out of the cold/warm water fan coil unit 430, indicates a return path.

In the cold/warm water piping system 100, the metal-reinforced composite pipe 300a preferably constitutes a pipe to be connected to a unit (in the embodiment, fan coil unit 430 having a built-in coil) containing a switching point of outward and return paths of cold/warm water. As is shown in the cold/warm water piping system 100, the metal-reinforced composite pipe 300a is connected to the fan coil unit 430 in both cases of outward and return paths. The fan coil unit 430 containing a switching point of outward and return paths of cold/warm water is disposed in a narrow piping space (for example, ceiling space), connection with the metal-reinforced composite pipe 300a is preferable in view of workability such as bendability. The metal-reinforced composite pipe 300a connected to the fan coil unit 430 is connected to the fiber-reinforced composite pipe 200a communicating with a hot-water boiler 410 or a refrigerator 420.

As the connection mode of the fiber-reinforced composite pipe 200a and the metal-reinforced composite pipe 300a, which is connected to the fan coil unit 430, the metal-reinforced composite pipe 300a connected to the fan coil unit 430 may be connected to a branched fiber-reinforced composite pipe 200a by a T-joint from the fiber-reinforced composite pipe 200a, as is shown in FIG. 2.

The cold/warm water piping system 100 according to the embodiment is a two-pipe cold/warm water system in which the same metal-reinforced composite pipe 300a and the same fiber-reinforced composite pipe 200a connected thereto are used for transporting both cold water and warm water. The fiber-reinforced composite pipe 200a is communicably branched into a hot-water pipe 510 connected to the hot-water boiler 410 and a cold-water pipe 520 connected to the refrigerator 420 by a three-way valve.

The cold/warm water piping system 100 further contains a cooling tower 450, which is connected to the refrigerator 420 by way of a cold-water pipe 550.

The hot-water pipe 510, cold-water pipe 520 and cold-water pipe 550 may not be necessary to be constituted of the fiber-reinforced composite pipe 200a since hot or cold water to be transported has a small temperature difference. However, there is a possibility that unexpectedly high-temperature water flows through the hot-water pipe 510 depending on the situation; and a possibility that the temperature of the pipe greatly changes depending upon an air conditioner is turned on or not (for example, when the outside air temperature is high and an air conditioner is turned off, the cold water pipes 520, 550 are warmed up by outside temperature; whereas, when the air conditioner is turned on, the cold water pipes 520,550 were cooled. In contrast, when the outside air temperature is low and an air conditioner is stopped, the hot-water pipe 510 is cooled by the outside temperature; whereas, when the air conditioner is turned on, the hot-water pipe 510 is warmed up). In view of expansion/contraction of a general resin pipe (resin pipe having no fiber-reinforced resin layer) presumed, these pipes are preferably constituted of the fiber-reinforced composite pipe 200a.

[2-2. Embodiment of Modified Constitution of a Cold/Warm Water Piping System]

In the embodiment, a cold/warm water piping system of an air conditioner is shown. The system of the present invention may be a cold/warm water piping system consisting of any combination of units, more specifically, a combination of a heat source, which is selected from a refrigerator, a heat pump and a boiler, and an air conditioner, which is selected from an air handling unit, a fan coil unit and an induction unit. Of them, the system of the present invention is particularly useful in the case where a fan coil unit used in the part where many fine branches are present, is selected as an air conditioner.

Furthermore, the cold/warm water piping system of the present invention can be applied to e.g., hot-water/cold-water supply piping systems for use in hot water dispensers such as a gas-fired boiler and a hot-water boiler, hot-water/cold water supply piping systems for use in e.g., apartment houses and independent houses, water-supply piping systems for humidifiers, and piping systems for ice thermal storage-type heat exchangers.

In the embodiment, a two-pipe cold/warm water pipe system is described as an example; however, the present invention may be a four-pipe cold/warm water pipe system. A cold-water pipe line and a warm-water pipe line are independent pipes and not communicable. Since the temperature of pipes greatly changes between turn-on and turn-off of an air conditioner, the fiber-reinforced composite pipe 200a is used similarly to the cold/warm water piping system 100 according to the embodiment.

In the embodiment, a mode where the metal-reinforced composite pipe 300a is used at a site where a branched pipeline from the fiber-reinforced composite pipe 200a is communicably connected to the fan coil unit 430, is shown;

however, the present invention can be also applied to a mode where a part of piping is repaired with the metal-reinforced composite pipe 300 in a narrow piping space (for example, ceiling space, wall back-space).

As to the mode of connecting the fiber-reinforced composite pipe 200*a* to the metal-reinforced composite pipe 300*a* connected to the fan coil unit 430, a mode of connecting the metal-reinforced composite pipe 300*a* to an elbow, which is branched from the fiber-reinforced composite pipe 200*a* by a T-joint; or a mode of connecting the metal-reinforced composite pipe 300*a* directly to the T-joint may be mentioned, other than that shown in the above embodiment.

Note that, as will be described later, the fiber-reinforced composite pipe 200*a* and the metal-reinforced composite pipe 300*a* contained in the cold/warm water piping system 100 both contain a heat insulating material. However, the present invention is not limited to the mode. Either one or both of the fiber-reinforced composite pipe 200*a* and the metal-reinforced composite pipe 300*a* may be replaced by the fiber-reinforced composite pipe 200 (described above) and the metal-reinforced composite pipe 300 (described later) containing no heat insulating material.

[2-3. Connecting Portion Between Fiber-Reinforced Composite Pipe and Metal-Reinforced Composite Pipe]

Figure 3:
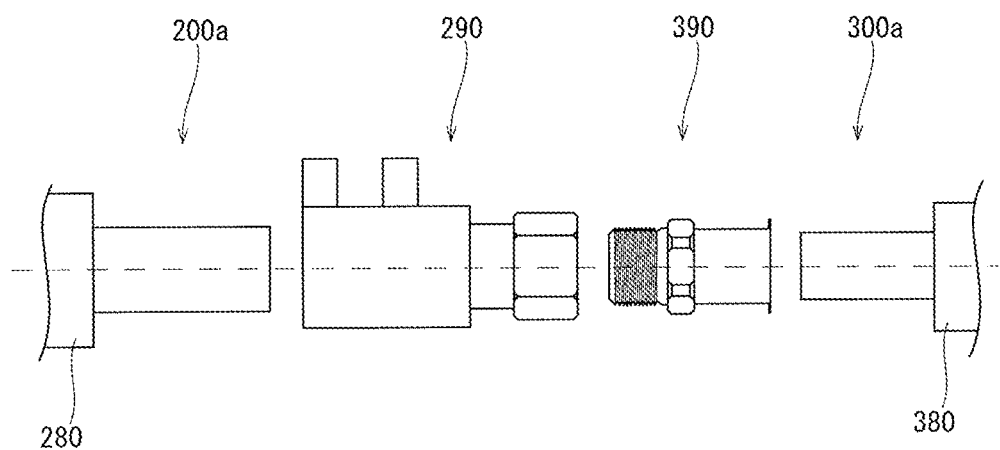
FIG. 3 is a schematic exploded view showing connection between the fiber-reinforced composite pipe and the metal-reinforced composite pipe in FIG. 2.

A schematic exploded view of a connecting portion between the fiber-reinforced composite pipe and the metal-reinforced composite pipe in the cold/warm water piping system of the present invention is shown in FIG. 3. As shown in FIG. 3, the fiber-reinforced composite pipe 200*a* and the metal-reinforced composite pipe 300*a* can be connected via an electrofusion joint 290 and a caulking joint 390. Note that, as shown in FIG. 3, a heat insulating material (heat insulating material 280 in FIG. 4 (described later), heat insulating material 380 in FIG. 5 (described later)) is absent in the end portion of the fiber-reinforced composite pipe 200*a* and the end portion of the metal-reinforced composite pipe 300*a* to be connected to respective joints.

The end portion of the fiber-reinforced composite pipe 200*a* is joined to the electrofusion joint 290. The electrofusion joint 290 has a junction area for electrofusion and a screw coupling area. The junction area for electrofusion joins the fiber-reinforced composite pipe 200 by applying the joint onto the end portion of the fiber-reinforced composite pipe 200*a* and then subjected to electrofusion joining. The screw coupling area is connected by screwing the screw coupling area (described later) of the caulking joint 390 to which the metal-reinforced composite pipe 300*a* is connected.

The end portion of the metal-reinforced composite pipe 300*a* is joined to the caulking joint 390. The caulking joint 390 has a caulking junction area and a screw coupling area. The caulking junction area joins the metal-reinforced composite pipe 300 by fitting the end portion of the metal-reinforced composite pipe 300*a* and caulking.

After the fiber-reinforced composite pipe 200*a* and the metal-reinforced composite pipe 300*a* are connected via the electrofusion joint 290 and the caulking joint 390, the portion not covered with a heat insulating material is covered with the heat insulating material to insulate the joining section.

Note that, in the embodiment, a mode (case) where the fiber-reinforced composite pipe 200*a* and the metal-reinforced composite pipe 300*a* are covered with a heat insulating material except the end portions involved in joining, from the beginning of connection, is mentioned; however, the invention is not limited to the mode (case). For example, the fiber-reinforced composite pipe 200*a* and the metal-reinforced composite pipe 300*a* both not covered with a heat insulating material are connected, and thereafter, the entire fiber-reinforced composite pipe 200*a*, the entire metal-reinforced composite pipe 300*a* and the joining section can be covered with the heat insulating material. Alternatively, the fiber-reinforced composite pipe 200*a* and the metal-reinforced composite pipe 300*a*, either one of which (for example, fiber-reinforced composite pipe 200*a*) is not covered with a heat insulating material, are connected and thereafter the entire of the pipe not covered with the heat insulating material (for example, fiber-reinforced composite pipe 200*a*) and the joining section can be covered with the heat insulating material.

[2-4. Embodiment of Modified Connecting Portion of Fiber-Reinforced Composite Pipe and Metal-Reinforced Composite Pipe]

In the embodiment, the mode where the screw coupling area of the electrofusion joint 290 of the fiber-reinforced composite pipe 200*a* is female, the screw coupling area of the caulking joint 390 of the metal-reinforced composite pipe 300*a* is male is shown; however, the female and male of the screw coupling areas may be opposite to each other.

In the embodiment, a mode where the electrofusion joint 290 is an in-line type is shown; however a branch-type may be employed. When the electrofusion joint 290 is a branch-type, two fiber-reinforced composite pipes 200*a* and a single metal-reinforced composite pipe 300*a* can be connected. In this case, branching may be made from the fiber-reinforced composite pipe 200*a* by use of a branch-type electrofusion joint 290 and the metal-reinforced composite pipe 300*a* can be directly connected to the branch-type electrofusion joint 290.

In the present invention, the connecting portion between the fiber-reinforced composite pipe 200*a* and the metal-reinforced composite pipe 300*a*, may be a connecting portion via a flange and a connection portion via a steel pipe, other than the aforementioned connecting portion.

[2-5. Fiber-Reinforced Composite Pipe]

Figure 4:
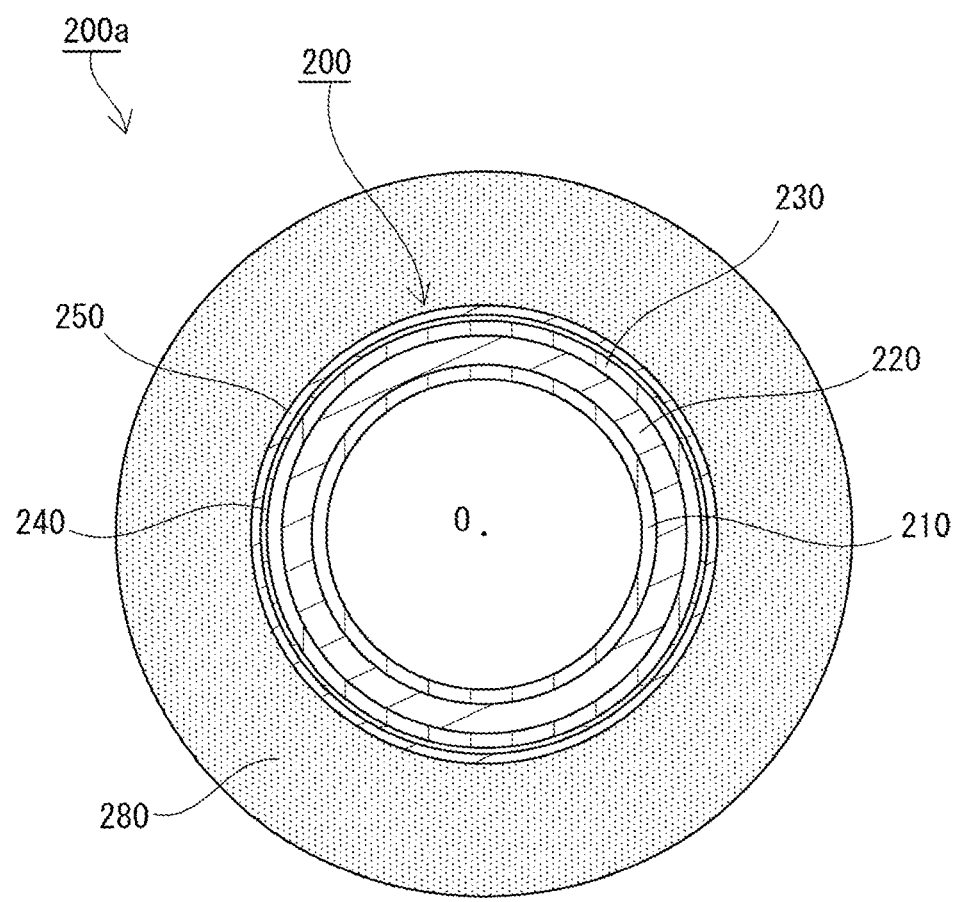
FIG. 4 is a schematic sectional view of the fiber-reinforced composite pipe in FIG. 2.

FIG. 4 is a schematic sectional view of the fiber-reinforced composite pipe 200*a* in FIG. 2.

The fiber-reinforced composite pipe 200*a* (multilayer compact) shown in FIG. 4 further comprises the heat insulating material 280 in addition to the fiber-reinforced composite pipe 200 described above. In the cold/warm water piping system 100, like the fiber-reinforced composite pipe 200*a*, the outer peripheral surface of the third layer 230 is preferably covered with the heat insulating material 280. In the case where the adhesive layer 240 and the gas barrier layer 250 are further provided outside a construct consisting of the first layer 210, second layer 220 and third layer 230, like the fiber-reinforced composite pipe 200 mentioned above, the heat insulating material 280 is provided on the outer peripheral surface of the gas barrier layer 250. The heat insulating material 280 may be provided in contact with the outer peripheral surface of the gas barrier layer 250.

The heat insulating material 280 is constituted of a structure having a relative large specific surface area. The heat insulating material 280 is preferably provided on the fiber-reinforced composite pipe 200*a* in order to block heat transfer between the cold/warm water transported through the fiber-reinforced composite pipe 200*a* and the external environment of the fiber-reinforced composite pipe 200*a*, thereby maintaining the temperature of the cold/warm water transported through the fiber-reinforced composite pipe 200*a* and in order to prevent dew condensation (dew condensation may serve as a factor significantly reducing heat retention) caused by the heat transfer.

The thickness of the heat insulating material 280, which is not particularly limited, may be 2% or more and 400% or less, and preferably 5% or more and 350% or less of the outer diameter of the fiber-reinforced composite pipe 200 to be insulated. The thickness is preferably the lower limit or more in order to maintain the temperature of cold/warm water and prevent dew condensation. The thickness is preferably the upper limit or less in view of workability.

[2-6. Metal-Reinforced Composite Pipe]

[2-6-1. Layer Structure]

Figure 5:
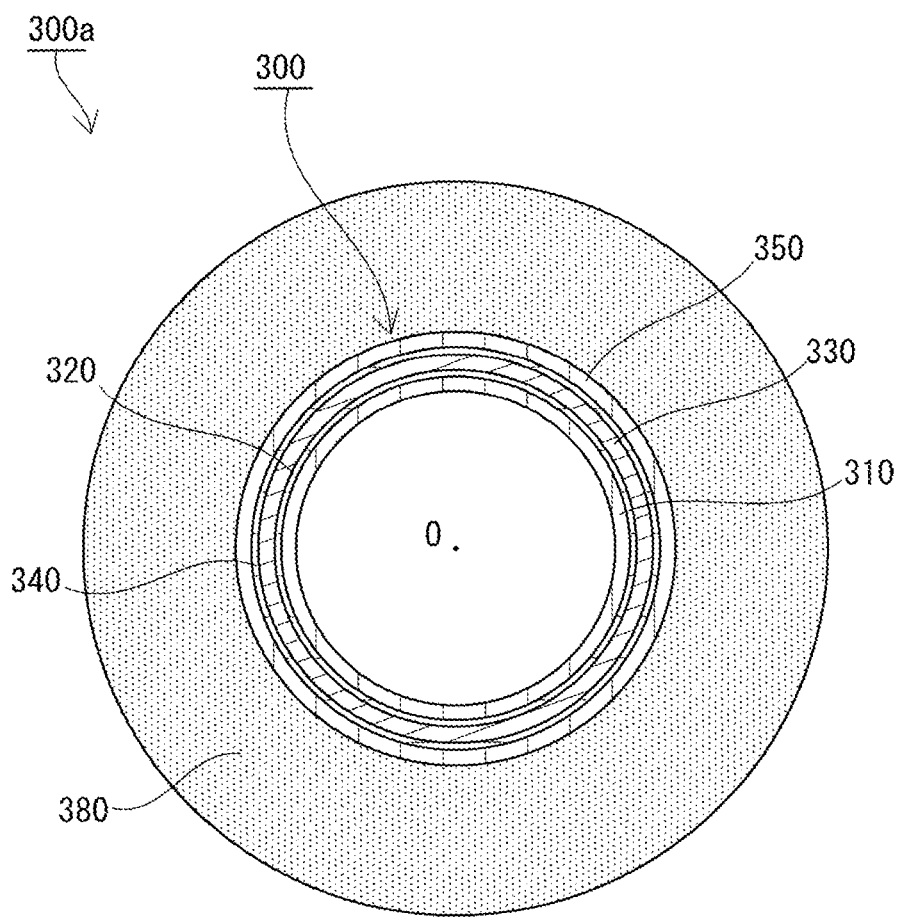
FIG. 5 is a schematic sectional view of the metal-reinforced composite pipe in FIG. 2.

FIG. 5 is a schematic sectional view of the metal-reinforced composite pipe 300a in FIG. 2.

The metal-reinforced composite pipe 300a shown in FIG. 5 contains the metal-reinforced composite pipe 300 and a heat insulating material 380.

The metal-reinforced composite pipe 300 comprises a first layer 310 of tubular form (inner layer/compact), a second layer 330 of tubular form (intermediate layer/metal) disposed on the outer side of the first layer 310 and a third layer 350 of tubular form (outer layer/compact) disposed on the outer side of the second layer 330. A first adhesive layer 320 is interposed between the first layer 310 and the second layer 330 and a second adhesive layer 340 is interposed between the second layer 330 and the third layer 350; however the adhesive layers are not indispensable. The first adhesive layer 320 and the second adhesive layer 340 are provided in order to enhance adhesion between the first layer 310 and the second layer 330 and between the second layer 330 and the third layer 350, respectively. Accordingly, the metal-reinforced composite pipe 300a is formed by laminating the first layer 310, the first adhesive layer 320, the second layer 330, the second adhesive layer 340 and the third layer 350 in this order from the center toward the outer periphery of the shaft.

The first layer 310 contains a polyolefin-based resin. The second layer 330 is constituted of a metal. The third layer 350 contains a polyolefin-based resin. The first layer 310 and the third layer 350 do not contain a glass fiber unlike the fiber-reinforced composite pipe 200 constituting the fiber-reinforced composite pipe 200a. The metal-reinforced composite pipe 300, since it contains the second layer 330 constituted of a metal as the intermediate layer, is excellent in bendability. The bendability refers to a property of easily bending but rarely returning to original shape once bent.

The first layer 310 is the innermost layer of the metal-reinforced composite pipe 300a and in contact with cold/warm water to be transported through the metal-reinforced composite pipe 300a. In the cold/warm water piping system 100, like the metal-reinforced composite pipe 300a, the outer peripheral surface of the metal-reinforced composite pipe 300 is preferably covered with the heat insulating material 380. The heat insulating material 380 is constituted of a structure having a large specific surface area. The heat insulating material 380 is provided on metal-reinforced composite pipe 300 in order to block heat transfer between the cold/warm water transported through the metal-reinforced composite pipe 300a and the external environment of the metal-reinforced composite pipe 300a, thereby maintaining the temperature of the cold/warm water transported through the metal-reinforced composite pipe 300a and in order to prevent dew condensation (dew condensation may serve as a factor significantly reducing heat retention) caused by the heat transfer.

In the metal-reinforced composite pipe 300 constituting the metal-reinforced composite pipe 300a, other layers, for example, a weather resistant layer as the outermost layer and a chemical resistant layer as the innermost layer may be laminated in addition to the first layer 310, the first adhesive layer 320, the second layer 330, the second adhesive layer 340 and the third layer 350.

[2-6-2. Thickness]

In the metal-reinforced composite pipe 300a, the ratio (r2) of the thickness of the second layer 330 relative to the thickness of the entire metal-reinforced composite pipe 300, may be for example 0.05 or more and 0.35 or less. The ratio (r2) is preferably 0.1 or more and preferably 0.2 or less. If the ratio (r2) is the lower limit or more, strength (reinforcement) is further more improved. If the ratio (r2) is the upper limit or less, bendability is further more improved.

In the metal-reinforced composite pipe 300a, the ratio (r1) of the thickness of the first layer 310 relative to the thickness of the entire metal-reinforced composite pipe 300 may be preferably 0.35 or more and more preferably 0.45 or more; and preferably 0.65 or less and more preferably 0.6 or less. If the ratio (r1) is the lower limit or more, heat resistance, chemical resistance, corrosion resistance and bendability are further more enhanced. If the ratio (r1) is the upper limit or less, rigidity and strength are further more improved.

In the metal-reinforced composite pipe 300a, the ratio (r3) of the thickness of the third layer 350 relative to the thickness of the entire metal-reinforced composite pipe 300 may be preferably 0.1 or more and more preferably 0.15 or more; and preferably 0.3 or less and more preferably 0.25 or less. If the ratio (r3) is the lower limit or more, heat resistance, chemical resistance, corrosion resistance and bendability are further more enhanced. If the ratio (r3) is the upper limit or less, rigidity and strength are further more improved.

The thickness of the metal-reinforced composite pipe 300 constituting the metal-reinforced composite pipe 300a is preferably 1 mm or more and more preferably 1.25 mm or more; and preferably 6 mm or less and more preferably 3.5 mm or less. If the thickness is the lower limit or more, rigidity, strength and pressure resistance are further more enhanced. If the thickness is the upper limit or less, bendability is further more enhanced and the weight is more reduced.

In the metal-reinforced composite pipe 300, the thickness of each of the first adhesive layer 320 and the second adhesive layer 340 is preferably 50 μm or more and more preferably 75 μm or more; and preferably 200 μm or less and more preferably 155 μm or less. If the thickness of each of the first adhesive layer 320 and the second adhesive layer 340 is the lower limit or more, the thickness is more easily controlled and adhesiveness is further more enhanced. If the thickness of each of the first adhesive layer 320 and the second adhesive layer 340 is the upper limit or less, bendability is further more improved and further, the amount of material to be used reduces and the material cost reduces, with the result that the weight of the layer reduces.

The thickness of the heat insulating material 380, which is not particularly limited, may be 2% or more and 400% or less and preferably 5% or more and 350% or less of the outer diameter of the metal-reinforced composite pipe 300 to be insulated. The thickness is preferably the lower limit or more in order to maintain the temperature of cold/warm water and prevent dew condensation. The thickness is preferably the upper limit or less in view of workability.

[2-6-3. Composition]

In the first layer 310, the content of a polyolefin-based resin is preferably 90 wt % or more and more preferably 95 wt % or more; and preferably 100 wt % (whole amount) or less. In the third layer 350, the content of a polyolefin-based resin is preferably 90 wt % or more and more preferably 95 wt % or more; and preferably 100 wt % (whole amount) or less.

[2-6-4. Components]

[2-6-4-1. Polyolefin-Based Resin]

The polyolefin-based resins to be used in the first layer 310 and the third layer 350 are not particularly limited and polyolefin-based resins known in the art can be used. The polyolefin-based resins may be used alone or in combination of two or more. The polyolefin-based resins to be used separately in the first layer 310 and the third layer 350 may be the same or different. For example, a resin more excellent in view of e.g., heat-resistance and durability can be selected for the first layer 310. The resin for the third layer 350 may not be particularly limited as long as the resin has a minimum resistance to e.g., external shock and rubbing and stress applied to the junction area of a joint for a long time. The resin may be selected, for example, based on availability such as cost.

Furthermore, the polyolefin-based resin to be used in each of the first layer 310 and the third layer 350 may be the same or different from the polyolefin-based resin to be used in the first layer 210, second layer 220 and/or third layer 230 of the fiber-reinforced composite pipe 200 mentioned above constituting the fiber-reinforced composite pipe 200a.

Examples of the polyolefin-based resin include a polyethylene, a polypropylene, a polybutene, an ethylene-vinyl acetate copolymer and an ethylene-α-olefin copolymer. In view of heat resistance and durability, a polyethylene or a polypropylene is preferable and a polyethylene is more preferable. Further, the polyolefin-based resin may be a crosslinked polyolefin-based resin (in particular crosslinked polyethylene PEX). Examples of the crosslinked polyolefin-based resin include a peroxide crosslinked polyolefin-based resin (in particular, peroxide crosslinked polyethylene PEX-A), silane crosslinked polyolefin-based resin (in particular, silane crosslinked polyethylene PEX-B) and an electron-beam irradiated crosslinked polyolefin-based resin (electron beam irradiated cross-linked polyethylene PEX-C). In view of heat resistance, durability and bendability, crosslinked polyethylene (PEX) and heat resistant polyethylene (PE-RT) are particularly preferable.

Examples of the polyethylene (PE) include LDPE, LLDPE and HDPE. Examples of the polypropylene (PP) include homo PP, block PP and random PP. Examples of the polybutene include polybutene-1.

The ethylene-α-olefin copolymer is particularly preferably a copolymer obtained by copolymerizing an α-olefin such as propylene, 1-butene, 1-pentene, 1-hexene, 4-methyl-1-pentene or 1-octene with an ethylene in a ratio of about several mol %.

As the polyolefin-based resin, a polyolefin-based resin having a long-term creep property may be selected. Owing to this, leakage accident caused by breakage can be prevented. For example, a heat resistant polyethylene (PE-RT) rarely produces knee points even if it is used at a high temperature of 90° C. for a long time and is excellent in durability. Alternatively, a polyolefin-based resin having a long-term creep property may be a resin adapting to PE100, which is obtained based on the long-term water pressure intensity in accordance with ISO/TR9080 and certifies that a pipe is not broken at a constant stress value of 10.0 MPa or more at 20° C. for 50 years.

[2-6-4-2. Metal]

As the metal constituting a metal layer, a metal as long as it is excellent in strength and extensibility can be selected without particular limitation. Examples of the metal include aluminum, copper and lead. Preferably, aluminum is used.

[2-6-4-3. Adhesive Resin]

As the material for the first adhesive layer 320 and the second adhesive layer 340, for example, a rubber-based hot melt adhesive and a modified polyolefin (particularly, modified polyethylene, modified polypropylene) and an ionomer may be mentioned. As the adhesive resin, the following resins may be used alone or in combination of two or more.

Examples of the modified polyolefin include an acid-modified polyolefin and a silane-modified polyolefin. As the modification mode for a polyolefin, modification with grafting and copolymerization may be mentioned. The acid-modified polyolefin is obtained by modifying a polyolefin-based resin with an unsaturated carboxylic acid or a derivative thereof. Examples of the unsaturated carboxylic acid include acrylic acid, methacrylic acid, maleic acid, nadic acid, fumaric acid, itaconic acid, crotonic acid, citraconic acid, sorbic acid, mesaconic acid, angelic acid and phthalic acid. Examples of the derivative of an unsaturated carboxylic acid include an acid, ester, amide, imide and metal salt of an unsaturated carboxylic acid. Specific examples thereof include maleic anhydride, itaconic anhydride, citraconic anhydride, nadic anhydride, phthalic anhydride, methyl acrylate, methyl methacrylate, ethyl acrylate, butyl acrylate, monoethyl ester of maleic acid, acrylamide, maleamic acid, maleimide, N-butyl maleimide, sodium acrylate and sodium methacrylate. Of them, an unsaturated dicarboxylic acid and a derivative thereof are preferable, particularly maleic anhydride and phthalic anhydride are preferable.

The ionomer is a resin obtained by neutralizing a polyolefin copolymer (as the co-monomer, an unsaturated carboxylic acid and an unsaturated carboxylic acid ester may be mentioned) by crosslinking between molecular chains with a metal ion. Copolymers may be used alone or in combination of a plurality of types. Examples of the metal ion include transition metal ions such as zinc, manganese and cobalt; alkali metal ions such as lithium, sodium and potassium; and alkaline earth metal ions such as calcium. These metal ions may be used alone in combination of plurality of types.

[2-6-4-4. Specific Examples]

In the case where the metal-reinforced composite pipe 300 is more specifically constituted of e.g., the first layer 310/the second layer 330/the third layer 350, silane modified PE (crosslinking PE)/aluminum/silane modified PE (crosslinking PE) may be mentioned. In this case, if the surface of aluminum is treated so as to be easily adhered to silane modified PE, both layers can be more tightly adhered due to an anchor effect. In the case where the metal-reinforced composite pipe 300 is constituted of the first layer 310/the first adhesive layer 320/the second layer 330/the second adhesive layer 340/the third layer 350, a structure consisting of PE-RT (heat-resistant PE)-maleic acid modified PE (adhesive layer)/aluminum/maleic acid modified PE (adhesive layer)/high density PE; and a structure consisting of silane modified PE (crosslinking PE)/maleic acid modified PE (adhesive layer)/aluminum/maleic acid modified PE (adhesive layer)/silane modified PE (crosslinking PE) are mentioned.

[2-6-4-5. Heat Insulating Material]

Examples of the structure having a large specific surface area constituting the heat insulating material 380 include porous materials (for example, resin foam) and fibrous materials (for example, nonwoven fabric, woven fabric, single fiber texture, mesh texture).

The resin foam may be a foam of the polyolefin-based resin as mentioned above as a resin to be used in the first layer 310 and the third layer 350, in view of e.g., heat insulating property, flexibility, dimensional stability and easiness of attachment. In order to more effectively obtain e.g., heat insulating property, flexibility, dimensional stability and easiness of attachment, the resin to be used in the first layer 310 and the third layer 350 is preferably a crosslinked polyolefin-based resin (crosslinked polyolefin-based resin) as mentioned above.

Examples of the fibrous material may include inorganic fibers such as a glass fiber and a carbon fiber; and organic fibers such as a natural fiber and a resin fiber.

[2-6-4-6. Other Components]

The first layer 310, third layer 350, first adhesive layer 320 and second adhesive layer 340 each may contain a thermoplastic resin other than a polyolefin-based resin as long as the layer can keep desired properties. Note that when a thermoplastic resin other than a polyolefin-based resin is contained, the content of the thermoplastic resin except a polyolefin-based resin in a polyolefin-based resin composition is preferably lower than the content of the polyolefin-based resin in the polyolefin-based resin composition (in short, less than 50% of the entire resin component content). As the other components, the same components as those mentioned in the fiber-reinforced composite pipe 200 constituting the fiber-reinforced composite pipe 200a; more specifically, the same thermoplastic resin other than a polyolefin-based resin, antioxidant, crosslinking agent, lubricant, light stabilizer and pigment, may be mentioned.

[2-6-5. Hot Internal Pressure Creep Performance]

The creep strength of the metal-reinforced composite pipe 300 may be 1.5 times or more and 3 times or less as large as that of the fiber-reinforced composite pipe 200.

[2-6-6. Opening Size]

The inner diameter of the metal-reinforced composite pipe 300 may be for example 75 mm or less and preferably 50 m or less in order to save a piping space. In consideration of processability such as bendability (flexibility) and easiness of attachment and connectability in a narrow piping space, the outer diameter of the metal-reinforced composite pipe 300 may be, for example 35 mm or less, preferably 34 mm or less and more preferably 28 mm or less. The lower limit of the opening size, which is not particularly limited; may be, for example, 10 mm in order to ensure a flow rate.

EXAMPLES

The present invention will be more specifically described by way of Examples; however, the present invention is not limited to the following Examples.

Example 1

A polyolefin-based resin composition for forming a second layer was obtained by blending 50 parts by weight of a polyethylene (polyethylene resin, PE100, density: 0.95 g/cm$^3$) as a polyolefin-based resin, 40 parts by weight of a glass fiber (fiber length 3 mm, fiber diameter 13 μm, aminosilane surface treatment) and 10 parts by weight of a silane modified polyethylene (density: 0.95 g/cm$^3$) serving as a compatibilizing agent. A polyethylene (PE100, density: 0.95 g/cm$^3$) as a polyolefin-based resin for forming a first layer and a third layer was prepared.

A fiber-reinforced composite pipe having a three-layer structure was obtained by extrusion molding of a polyethylene for forming the first layer, the polyolefin-based resin composition for forming the second layer and a polyethylene for forming the third layer.

More specifically, the first layer, second layer and third layer were independently formed by use of different single extruders. For the first layer and the third layer, a 40-mm single extruder was used and a 75-mm single extruder was used for the second layer. The extrusion temperature was specified as 200° C. As a mold, a specific three-layer mold was used. A three-layer pipe 50A having an outer diameter of 60 mm and the whole thickness of 5.5 mm was obtained.

Examples 2 to 13, 17 to 20 and Comparative Examples 1 to 9

Fiber-reinforced composite pipes were obtained in the same manner as in Example 1 except that the thicknesses and compositions of first layer, second layer and third layer were specified as shown in the following Tables 1 to 3.

Examples 14 to 16 and 21

Fiber-reinforced composite pipes were obtained in the same manner as in Example 1 except that three layer pipes were obtained by specifying the thicknesses and compositions of first layer, second layer and third layer as shown in the following Tables 2 and 3; an adhesive layer was formed on the outer side of the third layer by using a maleic anhydride modified polyethylene (density: 0.93 g/cm$^3$); and a gas barrier layer was formed on the outer side of the adhesive layer by using ethylene vinyl alcohol (density: 1.19 g/cm$^3$).

More specifically, an adhesive layer and a gas barrier layer were formed by using two single extruders on the outer side of the third layer of the three layer pipe. The extrusion temperature was specified as 200° C.

(Evaluation)

(1) Dimensional Stability (Linear Thermal Expansion Coefficient)

The linear thermal expansion coefficients of the fiber-reinforced composite pipes obtained were determined in accordance with the aforementioned method. Dimensional stability was determined in accordance with the following criteria.

[Criteria of Dimensional Stability]

◯: Linear thermal expansion coefficient is $4\times10^{-5}/°$ C. or less

Δ: Linear thermal expansion coefficient is beyond $4\times10^{-5}/°$ C. and $5\times10^{-5}/°$ C. or less ΔΔ: Linear thermal expansion coefficient is beyond $5\times10^{-5}/°$ C. and less than $5.5\times10^{-5}/°$ C.

x: Linear thermal expansion coefficient is $5.5\times10^{-5}/°$ C. or more (2) Hot Internal Pressure Creep Performance (1000 Hours)

The hot internal pressure creep performance of the obtained fiber-reinforced composite pipes at 80° C. was examined at 80° C. by use of a hot internal pressure creep test machine. The circumferential stress at a failure time of 1000 hours was evaluated. In the case where a circumferential stress was 5.0 MPa or more at a failure time of 1000 hours, the hot internal pressure creep performance at 80° C. is expressed as 1000 hours or more at a circumferential stress of 5.0 MPa. The hot internal pressure creep performance was determined in accordance with the following criteria.

[Criteria of Hot Internal Pressure Creep Performance (Circumferential Stress)]
○: Circumferential stress is 5.5 MPa or more
Δ: Circumferential stress is 5.24 MPa or more and less than 5.5 MPa
ΔΔ: Circumferential stress is 5 MPa or more and less than 5.24 MPa
x: Circumferential stress is less than 5 MPa or unable to be measured

[Criteria of Hot Internal Pressure Creep Performance (Breaking Form)]
○: Ductile fracture
Δ: Relatively brittle fracture
x: Brittle fracture (3) Workability
Workability was evaluated by scraping a third layer at a depth of 0.3 mm. Workability was determined in accordance with the following criteria.

[Criteria of Workability]
○: Able to be sufficiently scraped and EF joining can be made
x: No allowance for scraping and a second layer is exposed (4) Oxygen Permeability
Oxygen permeability was evaluated in accordance with DIN4726. Oxygen permeability was determined in accordance with the following criteria.

[Criteria of Oxygen Permeability]
○: Less than 0.32 mg/m²·day at 40° C.
Δ: 0.32 mg/m²·day or more at 40° C.
x: Unwanted air hole(s) are formed in a fiber-reinforced composite pipe by extrusion failure Details and results are shown in the following Table 1 to Table 5.

TABLE 1

|  |  | Example 1 | | Example 2 | | Example 3 | | Example 4 | |
| --- | --- | --- | --- | --- | --- | --- | --- | --- | --- |
|  |  | First/third layer | Second layer | First/third layer | Second layer | First/third layer | Second layer | First/third layer | Second layer |
| Thickness per layer (mm) |  | 1.32 | 2.86 | 1.32 | 2.86 | 1.32 | 2.86 | 1.32 | 2.86 |
| Second layer thickness/total thickness of first, second and third layers |  | 0.5 | | 0.5 | | 0.5 | | 0.5 | |
| Components (wt %) of first and third layers or components (wt %) of second layer | Polyethylene resin | 100 | 50 | 100 | 52 | 100 | 55 | 100 | 60 |
|  | Glass fiber |  | 40 |  | 40 |  | 40 |  | 35 |
|  | Compatibilizing agent (silane-modified polyethylene) |  | 10 |  | 8 |  | 5 |  | 5 |
| Component of adhesion layer (wt %) | Maleic anhydride modified polyethylene |  |  |  |  |  |  |  |  |
| Component of gas barrier layer (wt %) | Ethylene vinyl alcohol |  |  |  |  |  |  |  |  |
| Dimensional stability (linear thermal expansion coefficient (×10⁻⁵/° C.)) |  | 4.2 Δ | | 3.5 ○ | | 2.3 ○ | | 3.1 ○ | |
| Hot internal pressure creep performance (circumferential stress (Mpa)) |  | 5.24 Δ | | 5.71 ○ | | 5.98 ○ | | 6.00 ○ | |
| Hot internal pressure creep performance (breaking form) |  | Slightly bristle Δ | | Slightly bristle Δ | | Slightly bristle Δ | | Ductile ○ | |
| Workability |  | ○ | | ○ | | ○ | | ○ | |
| Oxygen permeability |  | Δ | | Δ | | Δ | | Δ | |

|  |  | Example 5 | | Example 6 | | Example 7 | | Example 8 | |
| --- | --- | --- | --- | --- | --- | --- | --- | --- | --- |
|  |  | First/third layer | Second layer | First/third layer | Second layer | First/third layer | Second layer | First/third layer | Second layer |
| Thickness per layer (mm) |  | 1.1 | 3.3 | 1.1 | 3.3 | 1.1 | 3.3 | 0.9 | 3.7 |
| Second layer thickness/total thickness of first, second and third layers |  | 0.6 | | 0.6 | | 0.6 | | 0.7 | |
| Components (wt %) of first and third layers or components (wt %) of second layer | Polyethylene resin | 100 | 66 | 100 | 65 | 100 | 64 | 100 | 65 |
|  | Glass fiber |  | 30 |  | 30 |  | 30 |  | 30 |
|  | Compatibilizing agent (silane-modified polyethylene) |  | 4 |  | 5 |  | 6 |  | 5 |
| Component of adhesion layer (wt %) | Maleic anhydride modified polyethylene |  |  |  |  |  |  |  |  |

TABLE 1-continued

|  |  | | | | |
|---|---|---|---|---|---|
| Component of gas barrier layer (wt %) | Ethylene vinyl alcohol | | | | |
| Dimensional stability (linear thermal expansion coefficient ($\times 10^{-5}/°$ C.)) | | 2.9 ○ | 3.2 ○ | 3.7 ○ | 2.5 ○ |
| Hot internal pressure creep performance (circumferential stress (Mpa)) | | 5.92 ○ | 6.00 ○ | 5.95 ○ | 5.99 ○ |
| Hot internal pressure creep performance (breaking form) | | Ductile ○ | Ductile ○ | Ductile ○ | Ductile ○ |
| Workability | | ○ | ○ | ○ | ○ |
| Oxygen permeability | | Δ | Δ | Δ | Δ |

TABLE 2

|  |  | Example 9 | | Example 10 | | Example 11 | | Example 12 | |
|---|---|---|---|---|---|---|---|---|---|
|  |  | First/third layer | Second layer | First/third layer | Second layer | First/third layer | Second layer | First/third layer | Second layer |
| Thickness per layer (mm) | | 0.77 | 3.96 | 0.77 | 3.96 | 0.55 | 4.4 | 0.55 | 4.4 |
| Second layer thickness/total thickness of first, second and third layers | | 0.7 | | 0.7 | | 0.8 | | 0.8 | |
| Components (wt %) of first and third layers or components (wt %) of second layer | Polyethylene resin | 100 | 65 | 100 | 70 | 100 | 75 | 100 | 78 |
|  | Glass fiber | | 30 | | 25 | | 20 | | 20 |
|  | Compatibilizing agent (silane-modified polyethylene) | | 5 | | 5 | | 5 | | 2 |
| Component of adhesion layer (wt %) | Maleic anhydride modified polyethylene | | | | | | | | |
| Component of gas barrier layer (wt %) | Ethylene vinyl alcohol | | | | | | | | |
| Dimensional stability (linear thermal expansion coefficient ($\times 10^{-5}/°$ C.)) | | 2 ○ | | 3.2 ○ | | 3.9 ○ | | 3.6 ○ | |
| Hot internal pressure creep performance (circumferential stress (Mpa)) | | 5.96 ○ | | 6.00 ○ | | 5.99 ○ | | 5.62 ○ | |
| Hot internal pressure creep performance (breaking form) | | Ductile ○ | | Ductile ○ | | Ductile ○ | | Ductile ○ | |
| Workability | | ○ | | ○ | | ○ | | ○ | |
| Oxygen permeability | | Δ | | Δ | | Δ | | Δ | |

TABLE 3

|  |  | Example 13 | | Example 14 | | | Example 15 | |
|---|---|---|---|---|---|---|---|---|
|  |  | First/third layer | Second layer | First/third layer | Second layer | Adhesive layer | Gas barrier layer | First/third layer | Second layer |
| Thickness per layer (mm) | | 0.55 | 4.4 | 1.1 | 3.3 | 0.05 | 0.075 | 1.1 | 3.3 |
| Second layer thickness/total thickness of first, second and third layers | | 0.8 | | 0.6 | | | | 0.6 | |
| Components (wt %) of first and third layers or components (wt %) of second layer | Polyethylene resin | 100 | 79 | 100 | 65 | | | 100 | 65 |
|  | Glass fiber | | 20 | | 30 | | | | 30 |
|  | Compatibilizing agent (silane-modified polyethylene) | | 1 | | 5 | | | | 5 |
| Component of adhesion layer (wt %) | Maleic anhydride modified polyethylene | | | | | 100 | | | |

TABLE 3-continued

|  |  | | | | | | |
|---|---|---|---|---|---|---|---|
| Component of gas barrier layer (wt %) | Ethylene vinyl alcohol | | | | 100 | | |
| Dimensional stability (linear thermal expansion coefficient ($\times 10^{-5}/°C$)) | | 4.4 Δ | | 3.2 ○ | | 3.2 ○ | |
| Hot internal pressure creep performance (circumferential stress (Mpa)) | | 5.37 Δ | | 6.00 ○ | | 6.00 ○ | |
| Hot internal pressure creep performance (breaking form) | | Ductile ○ | | Ductile ○ | | Ductile ○ | |
| Workability | | ○ | | ○ | | ○ | |
| Oxygen permeability | | Δ | | ○ | | ○ | |

|  |  | Example 15 | | Example 16 | | | |
|---|---|---|---|---|---|---|---|
|  |  | Adhesive layer | Gas barrier layer | First/third layer | Second layer | Adhesive layer | Gas barrier layer |
| Thickness per layer (mm) | | 0.2 | 0.2 | 1.1 | 3.3 | 0.05 | 0.04 |
| Second layer thickness/total thickness of first, second and third layers | | | | | 0.6 | | |
| Components (wt %) of first and third layers or components (wt %) of second layer | Polyethylene resin | | | 100 | 65 | | |
| | Glass fiber | | | | 30 | | |
| | Compatibilizing agent (silane-modified polyethylene) | | | | 5 | | |
| Component of adhesion layer (wt %) | Maleic anhydride modified polyethylene | 100 | | | | 100 | |
| Component of gas barrier layer (wt %) | Ethylene vinyl alcohol | | 100 | | | | 100 |
| Dimensional stability (linear thermal expansion coefficient ($\times 10^{-5}/°C$)) | | 3.2 ○ | | | | 3.2 ○ | |
| Hot internal pressure creep performance (circumferential stress (Mpa)) | | 6.00 ○ | | | | 6.00 ○ | |
| Hot internal pressure creep performance (breaking form) | | Ductile ○ | | | | Ductile ○ | |
| Workability | | ○ | | | | ○ | |
| Oxygen permeability | | ○ | | | | Δ | |

TABLE 4

|  |  | Example 17 | | Comparative Example 1 | | Comparative Example 2 | | Comparative Example 3 | |
|---|---|---|---|---|---|---|---|---|---|
|  |  | First/third layer | Second layer | First/third layer | Second layer | First/third layer | Second layer | First/third layer | Second layer |
| Thickness per layer (mm) | | 0.55 | 4.4 | 0.27 | 4.96 | 1.1 | 3.3 | 1.1 | 3.3 |
| Second layer thickness/total thickness of first, second and third layers | | 0.8 | | 0.9 | | 0.6 | | 0.6 | |
| Components (wt %) of first and third layers or components (wt %) of second layer | Polyethylene resin | 100 | 79.5 | 100 | 75 | 100 | 95 | 100 | 70 |
| | Glass fiber | | 20 | | 20 | | | | 30 |
| | Compatibilizing agent (silane-modified polyethylene) | | 0.5 | | 5 | | 5 | | |
| Component of adhesion layer (wt %) | Maleic anhydride modified polyethylene | | | | | | | | |
| Component of gas barrier layer (wt %) | Ethylene vinyl alcohol | | | | | | | | |
| Dimensional stability (linear thermal expansion coefficient ($\times 10^{-5}/°C$)) | | 5.2 ΔΔ | | 3.2 ○ | | 10.5 X | | 5.5 X | |

TABLE 4-continued

| | | | | | | | |
|---|---|---|---|---|---|---|---|
| Hot internal pressure creep performance (circumferential stress (Mpa)) | | 5.23 ΔΔ | | 6.00 ○ | | 5.8 ○ | Broken during pressure increase X |
| Hot internal pressure creep performance (breaking form) | | Ductile ○ | | Ductile ○ | | Ductile ○ | Brittle fracture X |
| Workability | | ○ | | X | | ○ | ○ |
| Oxygen permeability | | Δ | | Δ | | Δ | Δ |

| | | Comparative Example 4 | | Comparative Example 5 | | Example 18 | |
|---|---|---|---|---|---|---|---|
| | | First/third layer | Second layer | First/third layer | Second layer | First/third layer | Second layer |
| Thickness per layer (mm) | | 1.5 | 2.5 | 1.32 | 2.86 | 0.55 | 4.4 |
| Second layer thickness/total thickness of first, second and third layers | | | 0.5 | | 0.5 | | 0.8 |
| Components (wt %) of first and third layers or components (wt %) of second layer | Polyethylene resin | 100 | 49.7 | 100 | 49 | 100 | 80 |
| | Glass fiber | | 45.3 | | 40 | | 15 |
| | Compatibilizing agent (silane-modified polyethylene) | | 5 | | 11 | | 5 |
| Component of adhesion layer (wt %) | Maleic anhydride modified polyethylene | | | | | | |
| Component of gas barrier layer (wt %) | Ethylene vinyl alcohol | | | | | | |
| Dimensional stability (linear thermal expansion coefficient (×10⁻⁵/° C.)) | | | 2.4 ○ | | 4.8 Δ | | 5.2 ΔΔ |
| Hot internal pressure creep performance (circumferential stress (Mpa)) | | | 5.98 ○ | | 4.91 X | | 5.91 ○ |
| Hot internal pressure creep performance (breaking form) | | | Brittle fracture X | | Slightly bristle Δ | | Ductile ○ |
| Workability | | | ○ | | ○ | | ○ |
| Oxygen permeability | | | Δ | | Δ | | Δ |

TABLE 5

| | | Example 19 | | Example 20 | | Example 21 | | | |
|---|---|---|---|---|---|---|---|---|---|
| | | First/third layer | Second layer | First/third layer | Second layer | First/third layer | Second layer | Adhesive layer | Gas barrier layer |
| Thickness per layer (mm) | | 1.9 | 1.7 | 0.55 | 4.4 | 0.55 | 4.4 | 0.05 | 0.075 |
| Second layer thickness/total thickness of first, second and third layers | | | 0.3 | | 0.8 | | 0.8 | | |
| Components (wt %) of first and third layers or components (wt %) of second layer | Polyethylene resin | 100 | 50 | 100 | 80 | 100 | 75 | | |
| | Glass fiber | | 45 | | 15 | | 20 | | |
| | Compatibilizing agent (silane-modified polyethylene) | | 5 | | 5 | | 5 | | |
| Component of adhesion layer (wt %) | Maleic anhydride modified polyethylene | | | | | | | 100 | |
| Component of gas barrier layer (wt %) | Ethylene vinyl alcohol | | | | | | | | 100 |
| Dimensional stability (linear thermal expansion coefficient (×10⁻⁵/° C.)) | | | 4.6 Δ | | 5.2 ΔΔ | | 3.9 ○ | | |
| Hot internal pressure creep performance (circumferential stress (Mpa)) | | | 5.95 ○ | | 5.91 ○ | | 5.99 ○ | | |

TABLE 5-continued

| | Slightly bristle Δ | Ductile ○ | | Ductile ○ | |
|---|---|---|---|---|---|
| Hot internal pressure creep performance (breaking form) | | | | | |
| Workability | ○ | ○ | | ○ | |
| Oxygen permeability | Δ | Δ | | ○ | |

| | | Comparative Example 6 | | Comparative Example 7 | | Comparative Example 8 | | Comparative Example 9 | |
|---|---|---|---|---|---|---|---|---|---|
| | | First/third layer | Second layer | First/third layer | Second layer | First/third layer | Second layer | First/third layer | Second layer |
| Thickness per layer (mm) | | 0.55 | 4.4 | 1.5 | 2.5 | 0.55 | 4.4 | 2.2 | 1.1 |
| Second layer thickness/total thickness of first, second and third layers | | 0.8 | | 0.5 | | 0.8 | | 0.2 | |
| Components (wt %) of first and third layers or components (wt %) of second layer | Polyethylene resin | 100 | 84.5 | 100 | 45 | 100 | 85 | 100 | 50 |
| | Glass fiber | | 15 | | 50 | | 10 | | 45 |
| | Compatibilizing agent (silane-modified polyethylene) | | 0.5 | | 5 | | 5 | | 5 |
| Component of adhesion layer (wt %) | Maleic anhydride modified polyethylene | | | | | | | | |
| Component of gas barrier layer (wt %) | Ethylene vinyl alcohol | | | | | | | | |
| Dimensional stability (linear thermal expansion coefficient ($\times 10^{-5}$/° C.)) | | 6.5 X | | 1.6 ○ | | 6.6 X | | 6.2 X | |
| Hot internal pressure creep performance (circumferential stress (Mpa)) | | 5.15 ΔΔ | | 5.92 ○ | | 5.81 ○ | | 5.83 ○ | |
| Hot internal pressure creep performance (breaking form) | | Ductile ○ | | Brittle fracture X | | Ductile ○ | | Slightly bristle Δ | |
| Workability | | ○ | | ○ | | ○ | | ○ | |
| Oxygen permeability | | Δ | | Δ | | Δ | | Δ | |

Preferable embodiments of the present invention are as described above; however, the present invention is not limited to the aforementioned embodiments and is modified in various ways without deviating from the scope of the present invention.

REFERENCE SIGNS LIST

100 . . . cold/warm water piping system
200 . . . Fiber-reinforced composite pipe (multilayer compact)
210 . . . First layer (inner layer/compact)
220 . . . Second layer (intermediate layer/compact)
230 . . . Third layer (outer layer/compact)
240 . . . Adhesive layer
250 . . . Gas barrier layer
200a . . . Fiber-reinforced composite pipe
290 . . . Connecting member
300a . . . Metal-reinforced composite pipe

The invention claimed is:

1. A multi-layered pipe through which a cold/warm water flows comprising:
a first layer of tubular form containing a polyethylene resin, a second layer of tubular form containing a polyethylene resin, a glass fiber and a compatibilizing agent, a third layer of tubular form containing a polyethylene resin, an adhesive layer, and a gas barrier layer; wherein
the second layer is disposed on the outer side of the first layer, the third layer is disposed on the outer side of the second layer, the adhesive layer is disposed on the outer side of the third layer, and the gas barrier layer is disposed on the outer side of the adhesive layer;
a ratio of a thickness of the second layer relative to a total thickness of the first, second and third layers is 0.3 or more and 0.8 or less; and
a content of the polyethylene resin is 45 wt % or more and 84 wt % or less, a content of the glass fiber is 15 wt % or more and 45 wt % or less and a content of the compatibilizing agent is 0.5 wt % or more and 10 wt % or less in 100 wt % of the second layer.

2. The multi-layered pipe according to claim 1, wherein the gas barrier layer is the outermost layer.

3. The multi-layered pipe according to claim 1, wherein a total thickness of the adhesive layer and the gas barrier layer is 0.125 mm or more and 0.4 or less.

4. The multi-layered pipe according to claim 1, wherein a content of the compatibilizing agent is 2 wt % or more and 8 wt % or less.

5. The multi-layered pipe according to claim 1, wherein the gas barrier layer contains at least one type of a gas barrier resin selected from a group consisting of a polyvinyl alcohol, an ethylene vinyl alcohol copolymer, a polyvinylidene chloride and a polyacrylonitrile.

6. A cold/warm water piping system comprising:
the multi-layered pipe according to claim 1;
a metal-reinforced composite pipe containing a polyethylene resin and a metal; and
a connecting member connecting the multi-layered pipe and the metal-reinforced composite pipe;
wherein
the multi-layered pipe has a linear thermal expansion coefficient of $10 \times 10^{-5}$/° C. or less;

the multi-layered pipe occupies a volume of 70% or more of a total volume of the multi-layered pipe and the metal-reinforced composite pipe; and cold/warm water having a temperature width of 20° C. or more is transported.

7. The cold/warm water piping system according to claim 6, wherein the multi-layered pipe has an inner diameter of 19 mm or more and the metal-reinforced composite pipe has an inner diameter of 75 mm or less.

8. The cold/warm water piping system according to claim 6, wherein the connecting member comprises
   a junction area for electrofusion for connecting with the multi-layered pipe, and
   a screw coupling area for connecting to the metal-reinforced composite pipe.

* * * * *